US007660835B2

(12) United States Patent
Hayashi et al.

(10) Patent No.: US 7,660,835 B2
(45) Date of Patent: *Feb. 9, 2010

(54) INFORMATION PROCESSING SYSTEM, INFORMATION PROCESSING METHOD AND INFORMATION PROCESSING PROGRAM

(75) Inventors: Naoki Hayashi, Kanagawa (JP); Hiroyuki Hotta, Kanagawa (JP); Minoru Koshimizu, Kanagawa (JP); Yoshitsugu Hirose, Kanagawa (JP); Tsutomu Ishii, Kanagawa (JP); Shigehiko Sasaki, Kanagawa (JP); Masahiro Sato, Kanagawa (JP); Takashi Ozawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 413 days.

This patent is subject to a terminal disclaimer.

(21) Appl. No.: 11/518,460

(22) Filed: Sep. 11, 2006

(65) Prior Publication Data
US 2007/0208785 A1 Sep. 6, 2007

(30) Foreign Application Priority Data
Mar. 6, 2006 (JP) ............................. 2006-060117

(51) Int. Cl.
*G06F 17/30* (2006.01)
(52) U.S. Cl. ..................................... 707/203; 707/104.1
(58) Field of Classification Search .................. 707/203, 707/104.1
See application file for complete search history.

(56) References Cited

U.S. PATENT DOCUMENTS

| 5,483,255 | A  | * | 1/1996  | Numao ........................ 345/98 |
| 5,515,144 | A  | * | 5/1996  | Miyasaka et al. .............. 399/1 |
| 6,459,442 | B1 | * | 10/2002 | Edwards et al. ............. 715/863 |
| 2003/0012916 | A1 | * | 1/2003 | Kobayashi et al. ......... 428/64.4 |
| 2004/0085301 | A1 | * | 5/2004 | Furukawa et al. ........... 345/179 |
| 2007/0206922 | A1 | * | 9/2007 | Koshimizu et al. ........... 386/95 |

FOREIGN PATENT DOCUMENTS

| JP | A 11-250053 | 9/1999 |
| JP | A 2002-32397 | 1/2002 |
| JP | A 2004-30623 | 1/2004 |

* cited by examiner

*Primary Examiner*—James Trujillo
*Assistant Examiner*—William Spieler
(74) *Attorney, Agent, or Firm*—Oliff & Berridge, PLC

(57) ABSTRACT

An information processing system for management of various pieces of information, the information processing system includes: a plurality of display record media, each having a unique identifier; an information selection section that selects information to be displayed; an information rewrite section that rewritably writes the information; a manipulation detection section that detects a selective manipulation of a user on the display record medium; a history storage section that records a history of the information and a history of the manipulations in association with a unique identifier of the display record medium, respectively; a manipulation history determination section for a user to determine any manipulation history out of a list of the histories of the manipulations; and an information search section that searches for at least one of a history of the information, a history of other manipulations and a unique identifier of the display record medium.

18 Claims, 14 Drawing Sheets

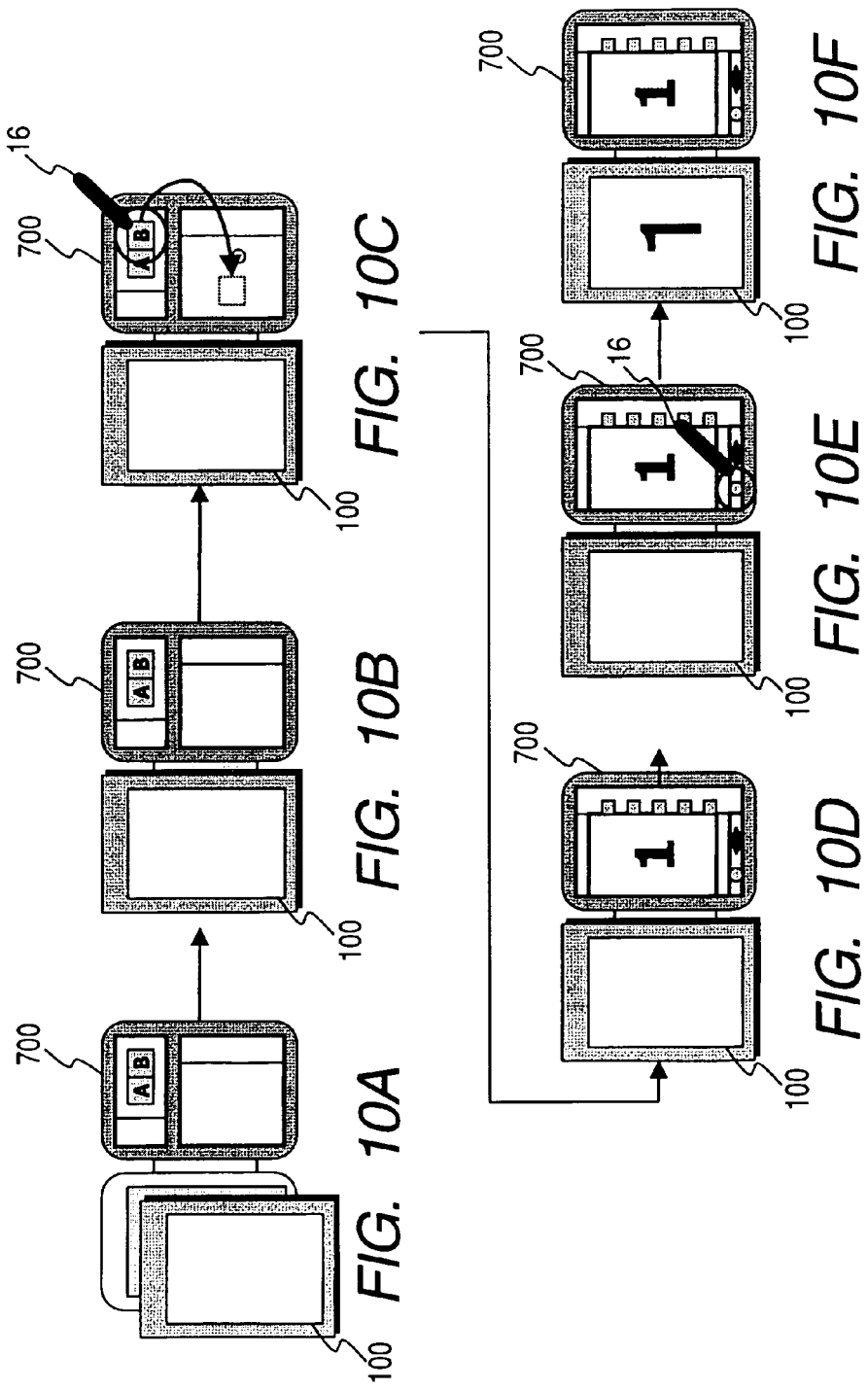

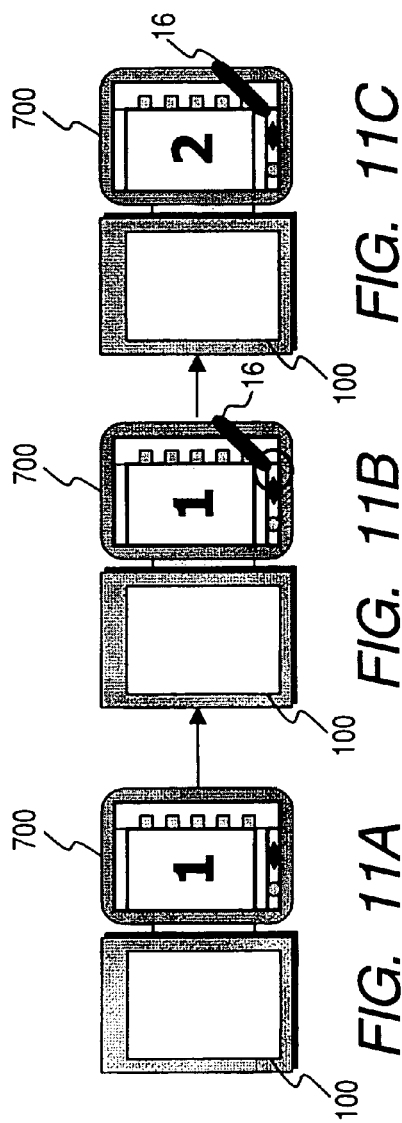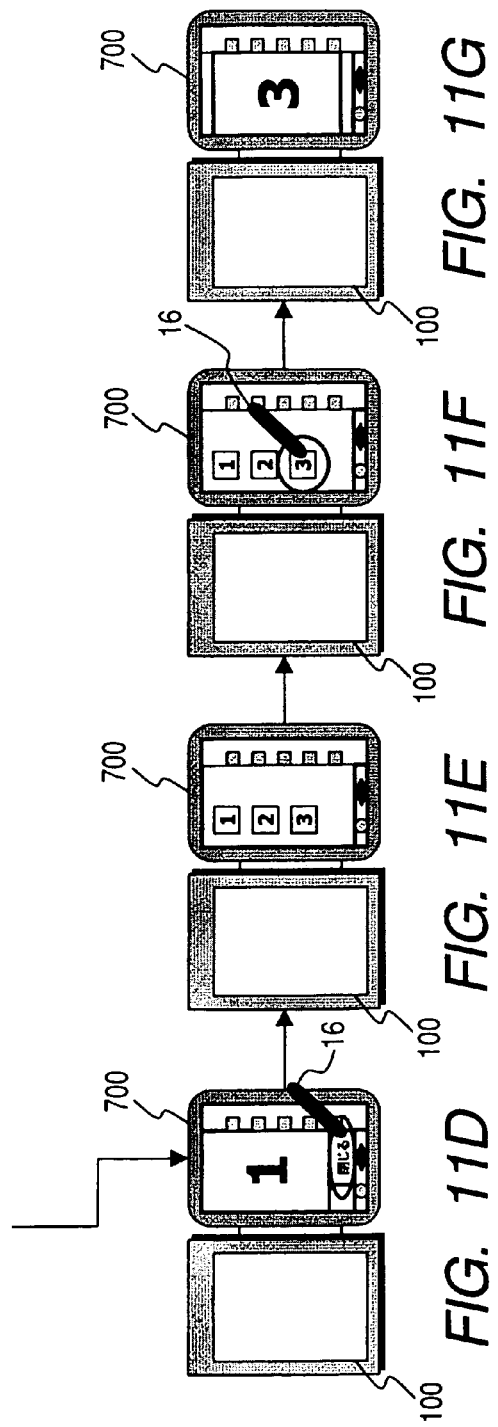

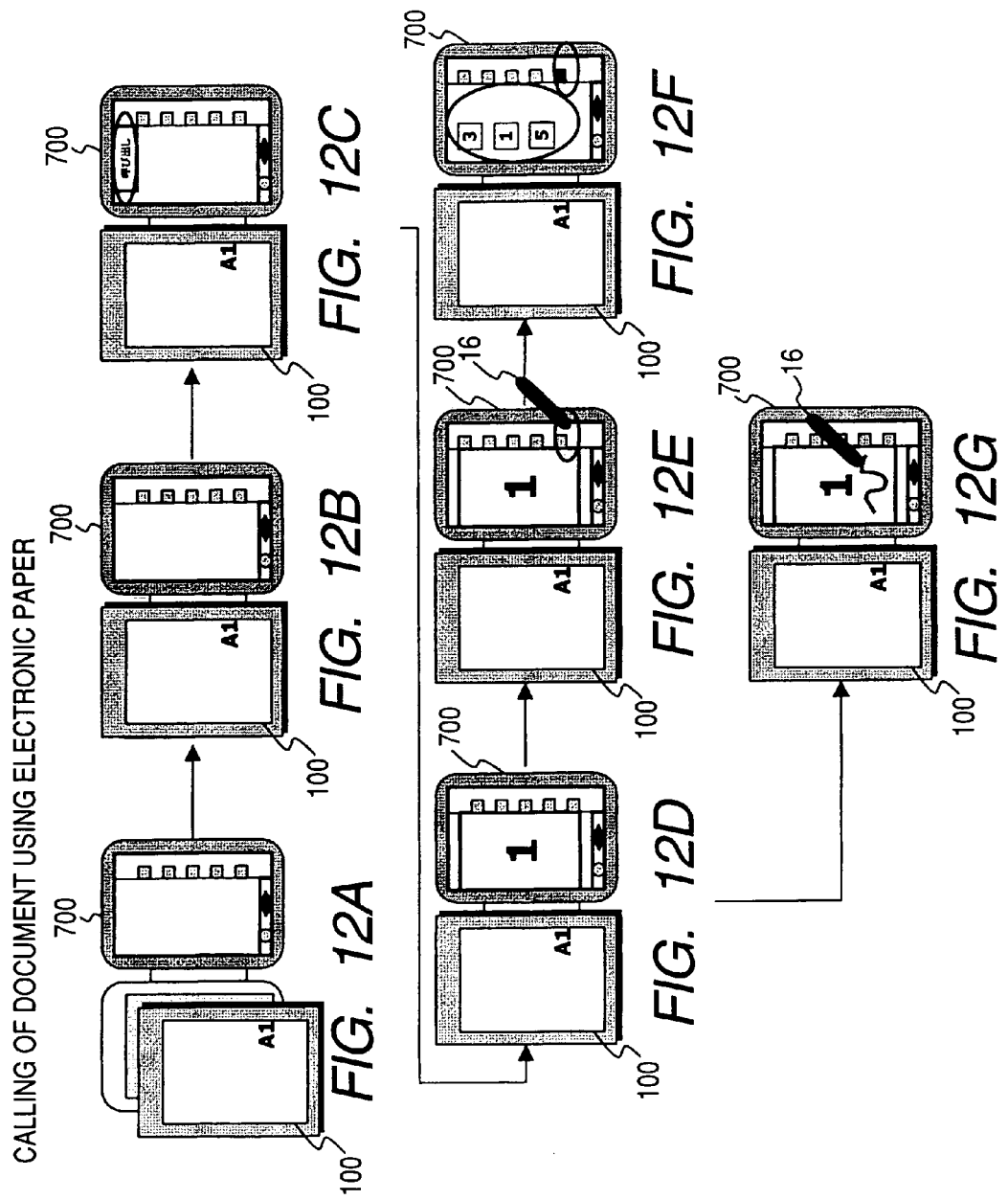

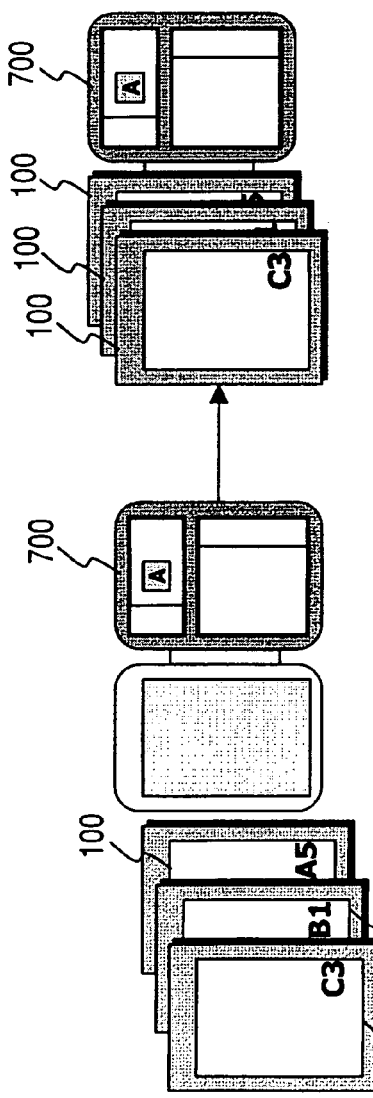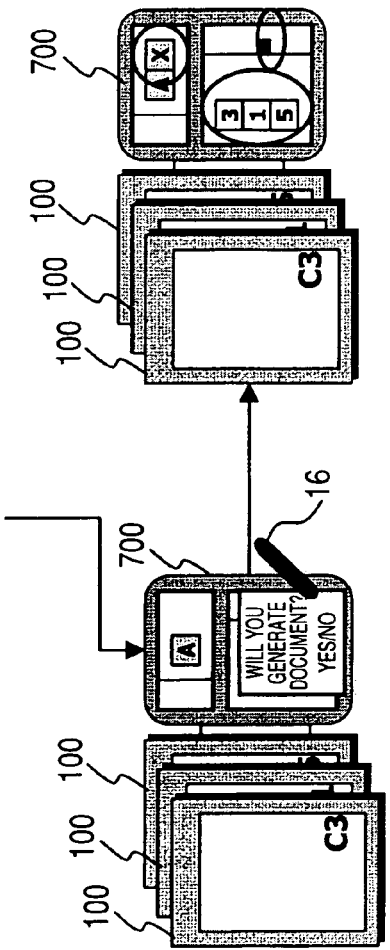
DOCUMENT MANIPULATION USING ELECTRONIC PAPER
FIG. 13A  FIG. 13B
FIG. 13C  FIG. 13D

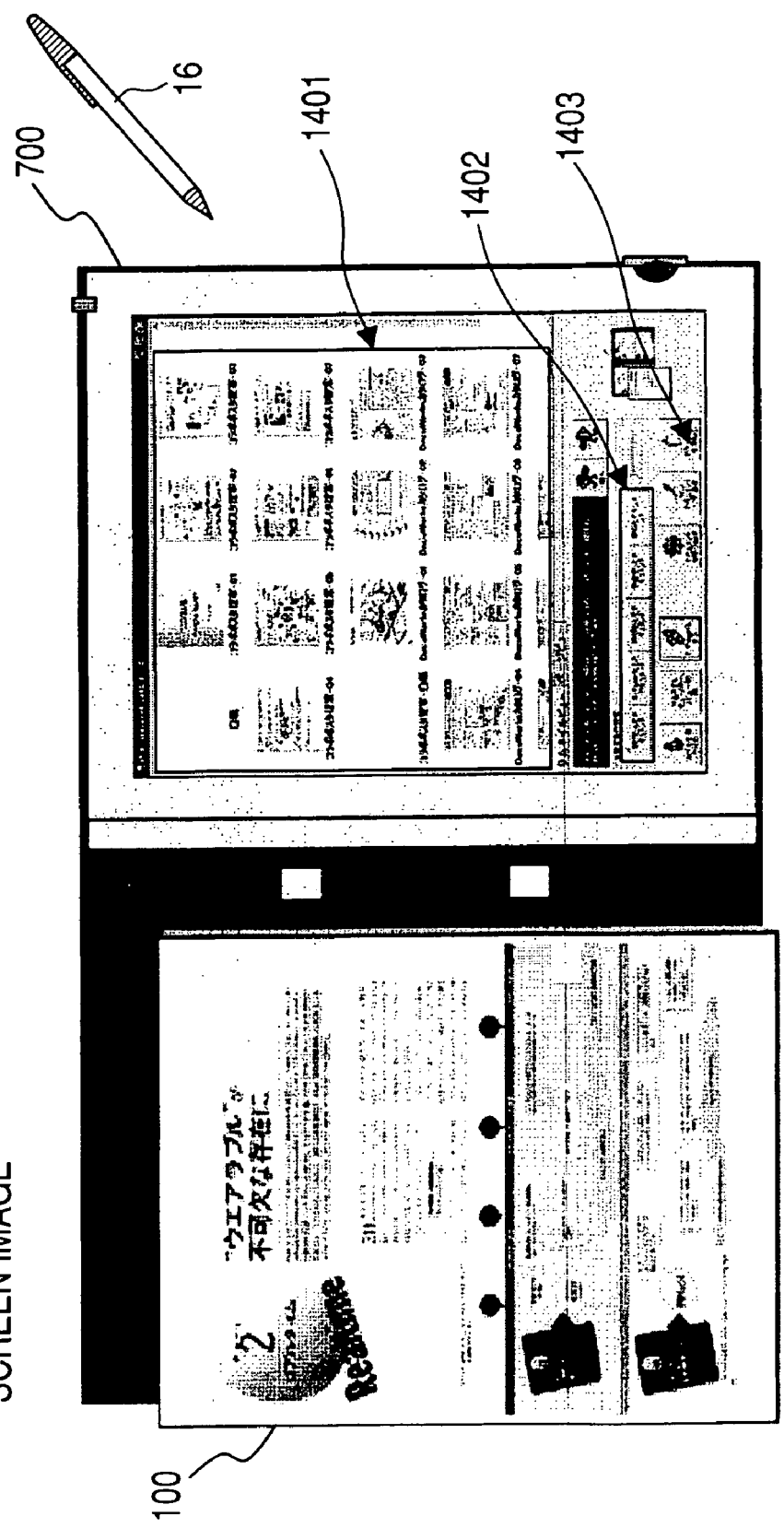

INFORMATION PROCESSING SYSTEM, INFORMATION PROCESSING METHOD AND INFORMATION PROCESSING PROGRAM

BACKGROUND

1. Technical Field

This invention relates to an information processing system, an information processing method, and an information processing program used for management of various pieces of information and in particular to those of which the user makes the most for an interview and a business talk as face-to-face communications.

2. Related Art

Hitherto, document use methods in a meeting (interview, business talk) generally have been roughly classified into a method of searching for and referencing the documents used in past meetings, a method of creating and referencing a new document in a meeting, and a method of newly searching for and referencing relevant documents. Widely available document search systems at present include a hierarchical management system (electronic folder system), intra-document full-text search system, a document image search system, etc., for example.

As this kind of technology, for example, JP-A-11-250053 specifically describes the following: To efficiently associate a manipulation history concerning a document and work with each other and display the manipulation history in an ease-of-use manner, JP-A-11-250053 describes an information processing system wherein if a history search section searches the manipulation histories stored in a history storage section for the manipulation history concerning the user corresponding to an entered display command and the found manipulation histories are listed through a history display section, when any of the listed manipulation histories is selected, a work search processing section searches work stored in a work storage section for the work containing the manipulation history with the document concerning the selected manipulation history as the manipulation target and lists the work through the history display section.

JP-A-2002-32397 describes the following: To enable the user to search if the user cannot recollect a document title of a descriptive search expression, a search apparatus includes a first storage section for storing data as a manipulation target as manipulation target data, an acquisition section for acquiring time series image data photographing the apparatus for manipulating the manipulation target data and the periphery of the apparatus, the extraction section for extracting image data of a scene to make it possible to determine the environment in manipulating the manipulation target data as environment information, the selection section for selecting the environment information at the searching time, and the search section for searching the manipulation target data stored in the first storage section for the manipulation target data associated with the environment information selected in the selection section.

Further, JP-A-2004-30623 describes the following: To easily search for any desired part in video information and audio information recorded during working, a work situation management apparatus includes a storage section for storing information representing the time lapse of work and determines the time zone to be given a keyword in the time required for the work based on the information representing the time lapse of the work, determines keyword candidates relative to the determined time zone, selects one from among the keyword candidates, and determines that the selected keyword candidate is the keyword corresponding to the time zone.

SUMMARY

It is an object of the invention to provide an information processing system, an information processing method, and an information processing program that can present various pieces of information in an easy-to-view and easy-to-handle manner, enables the user to easily compare and examine the information, can record a history of information presented off the cuff in response to the user's demand in the scene, can easily record and store the information finally determined useful in the presented information in a reusable manner, and further can easily search for any desired information based on some manipulation of the user on the information.

According to an aspect of the invention, there is provided an information processing system for management of various pieces of information, the information processing system comprising:

a plurality of display record media, each having a unique identifier, where display information can be rewritten;

an information selection section that selects information to be displayed on the display record medium;

an information rewrite section that rewritably writes the information selected by the information selection section to the display record medium;

a manipulation detection section that detects a selective manipulation of a user on the display record medium displaying the information;

a history storage section that records a history of the information written to the display record medium by the information rewrite section and a history of the manipulations detected by the manipulation detection section in association with a unique identifier of the display record medium, respectively;

a manipulation history determination section for a user to determine any manipulation history out of a list of the histories of the manipulations on the display record media, recorded in the history storage section; and an information search section that searches for, in responsive to the manipulation history determined by the manipulation history determination section, at least one of a history of the information written to the display record medium associated with the manipulation history, a history of other manipulations on the display record medium and a unique identifier of the display record medium.

BRIEF DESCRIPTION OF THE DRAWINGS

Exemplary embodiments of the present invention will be described in detail based on the following figures, wherein:

FIGS. 10A to 10F are drawings to describe a manipulation procedure example for outputting information to optical write type electronic paper (No. 1);

FIGS. 11A to 11G are drawings to describe a manipulation procedure example for outputting information to optical write type electronic paper (No. 2);

FIGS. 12A to 12G are drawings to describe a manipulation procedure example for calling information using optical write type electronic paper;

FIGS. 13A to 13D are drawings to describe a manipulation procedure example for document manipulation using optical write type electronic paper;

FIG. 14 is a drawing to describe a screen image example in the third exemplary embodiment of the invention.

DETAILED DESCRIPTION

Figure 1:
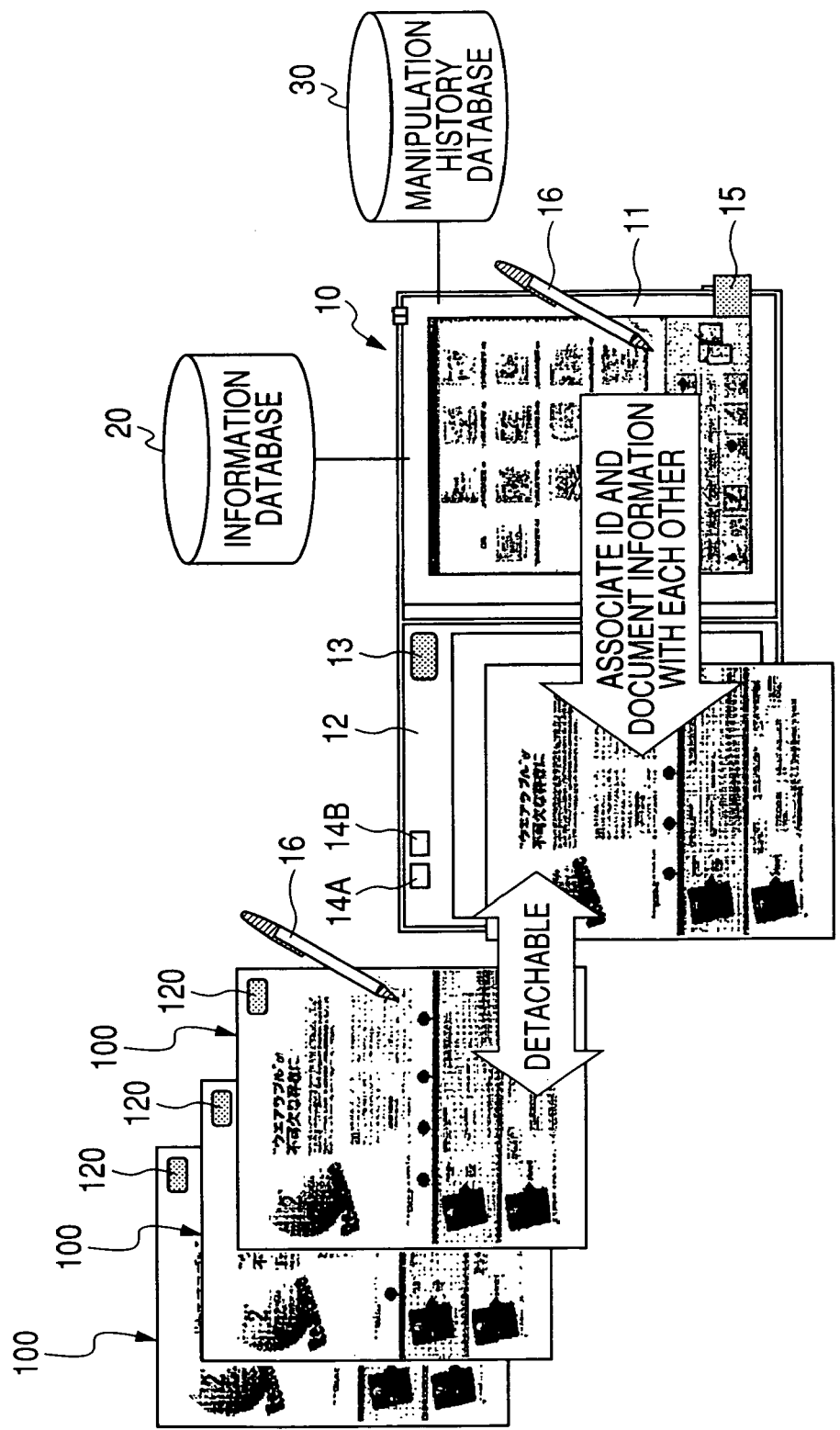
FIG. 1 is a configuration drawing to schematically show the whole of an information presentation system according to a first exemplary embodiment of the invention.

The invention functions as follows:

The information processing system, the information processing method, and the information processing program according to the invention are used to support interactions of an interview, a business talk, etc., based on presentation of various pieces of information in the scene where concerned parties of a client, a user, etc., face each other. An outline of the functions is as follows: The information used for interaction is previously stored in a database constructed in external or internal memory of the system, for example, the information to be written to a display record medium is selected through the information selection section from among the stored information pieces, the history of the information written to the display record medium and the history of the manipulations on the display record medium are stored in association with the unique identifier of the display record medium, and a search is made for information using the manipulation executed on the display record medium as a key.

A plurality of display record media are provided so that the user can compare and examine the information on the display record media placed side by side. Each display record medium has a unique identifier and thus can be identified. For example, a medium which allows display information to be rewritten and can be used repeatedly, such as an optical write type display record medium or a display record medium driven electrically by a pixel electrode, can be adopted as the display record medium. The information refers mainly to document information, but is not limited to text and also includes various pieces of data of pattern, symbol, table, image, video, audio, etc.

The information selected through the information selection section can be written by the information rewrite section as rewritable information with a display record medium put on the information rewrite section. The information written to the display record medium is recorded in the history storage section in association with the unique identifier of the display record medium together with the history of the information. The manipulation executed on the display record medium is recorded in the history storage section in association with the unique identifier of the display record medium together with the history of the manipulation. The records concerning the histories, etc., can be used for various applications; for example, it is also made possible to utilize the records for analysis of customer's likes, etc., for making the records useful for the next business talk, etc.

The manipulation detection section can detect the selective manipulation of the user on the display record medium displaying the information. The selective manipulation of the user involves the action of the user intentionally selecting and picking up one from among the display record media displaying the information, selective additional write manipulation of the user to the display record medium displaying the information, manipulation on the input operation device provided on the display record medium, addition of a handwritten image, etc., for example. If the manipulations and the manipulation descriptions are also recorded in the history storage section, the information can be utilized as more useful and advantageous information concerning the user.

Particularly in the system, the manipulation history determination section allows the user to determine any manipulation history out of a list of the histories of the manipulations on the display record media, recorded in the history storage section. The manipulation history list can be output in any of the following formats: Classification format by manipulation type, classification format by number of manipulation times in units of display record media or information written to display record media, or classification format by manipulation time.

The information search section searches for at least any of a history of the information written to the display record medium associated with the determined manipulation history, a history of other manipulations on the display record medium, or the unique identifier of the display record medium in response to the manipulation history determined through the manipulation history determination section. Accordingly, it is made possible to search for the information used at the interview time from the manipulation executed in the interview.

Referring now to the accompanying drawings, there are shown preferred exemplary embodiments of the invention.

FIGS. 1 to 5 show a first exemplary embodiment of the invention. FIG. 1 is a conceptual system configuration drawing of the first exemplary embodiment of the invention. An information presentation system according to the exemplary embodiment is intended as a system of which the user makes the most for an interview and a business talk as face-to-face communications among a small number of persons. The system is not only a system made up of a plurality of computers, hardware, units, etc., connected by a network, etc., but also a system implemented as one computer. As the former system example, a system made up of a thin client and a server can be named wherein a terminal section operated by the user is simplified only as an interface function having input and display functions and the actual program is executed in an information processing apparatus connected to the network and only a screen image and a user-entered command are transferred in two ways between the terminal section and the information processing apparatus. To adopt such a system configuration, no information is left in the terminal section, whereby the security can be enhanced and the terminal section can be made lightweight and can consume low power; particularly, the system is appropriate for use with the operation section brought to an environment outside the security like a business talk. The information includes text information, graphics information, image information, video information, audio information, a combination thereof, etc., and more particularly document information used with business and the like.

A module refers to a generally and logically detachable part of software, hardware, etc. Therefore, the module in the exemplary embodiment means not only a module in a program, but also a module in the hardware configuration. Therefore, the exemplary embodiment described below also serves as the description of an apparatus, a method, and a program. Modules are almost in a one-to-one correspondence with functions; however, in implementation, one module may be one program or two or more modules may make up one program or two or more programs may make up one module. Two or more modules may be executed by one apparatus or one module may be executed in two or more apparatus in a distributed or parallel environment. In the description to follow, the term "connection" contains not only physical connection (wired, wireless), but also logical connection.

As shown in FIG. 1, the information presentation system is made up of display record media where display information can be rewritten, a display record medium terminal 10 for handling the display record media, an information database 20 and a manipulation history database 30 of external storage that can transfer information to and from the display record medium terminal 10 via a wireless or wire communication line, and the like. The information presentation system also includes a digital pen 16 as a handwrite input module for erasably adding a handwritten image onto a display area of the display record medium. The digital pen 16 can acquire the coordinates of the pen point by electric, electromagnetic, or optical read section and transmits acquired information to the display record medium terminal 10. The display information contains document information centering on text information assumed for use in business, graphics information, image information, and moving image information and audio information, etc., depending on the situation. The specific configuration will be discussed below:

The display record medium may be any if display information can be rewritten. For example, preferably a paper-like flexible and thin medium called electronic paper or digital paper where an image can be rewritten, capable of holding display of an image in a no-power supply state is used. As a specific example of such electronic paper, optical write type electronic paper 100 can be used.

Figure 2:
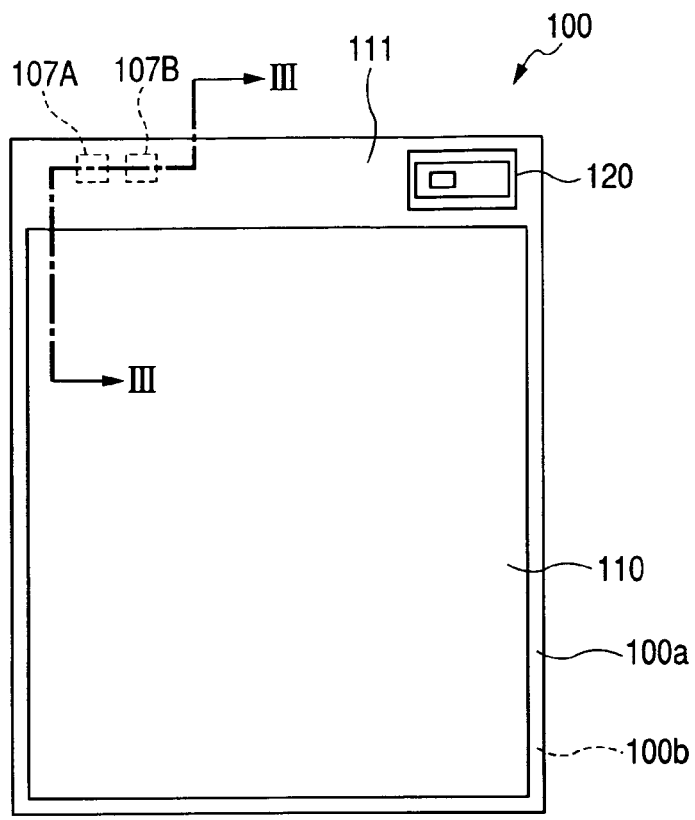
FIG. 2 is a plan view to show optical write type electronic paper of a display record medium of the information presentation system according to the first exemplary embodiment of the invention.

FIG. 2 is a plan view of the optical write type electronic paper 100. The optical write type electronic paper 100 has a thin rectangular shape and is provided with an image display record area 110 on a surface 100a, an RFID tag 120 made up of an IC tip as a unique identifier (ID) and an antenna, embedded in a peripheral area 111, and a pair of power receiving terminals 107A and 107B on a back 100b.

An identifiable identifier may be formed using a contact or non-contact IC card or IC label rather than the RFID tag 120. In addition, as identifiable ID, optically readable ID such as a bar code or a two-dimensional bar code may be formed or an identifiable identifier using an ID module capable of magnetic read may be formed.

Figure 3:
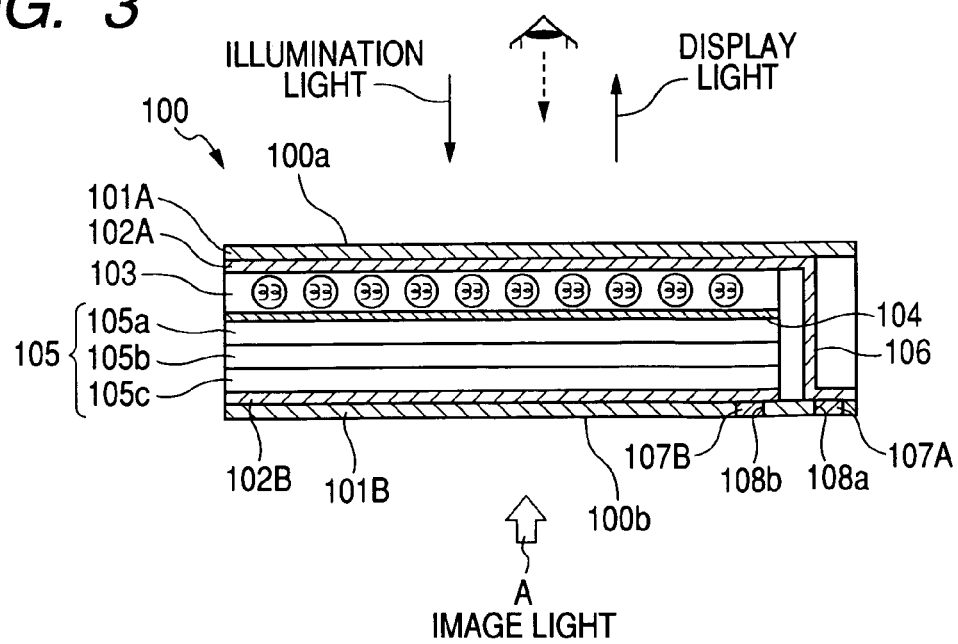
FIG. 3 is a sectional view taken on line III-III in FIG. 2.

FIG. 3 is a sectional view taken on line III-III in FIG. 2. The optical write type electronic paper 100 is made up of a pair of substrates 101A and 101B of transparent PET (polyethylene terephthalate) placed facing each other, a pair of transparent electrodes 102A and 102B made of ITO (indium tin oxide) provided inside the substrates 101A and 101B, a liquid crystal layer 103 provided inside the transparent electrode 102A on the side of the surface 100a and made of crystal liquid having a memory property with reflectivity (transmittance) changing in response to applied voltage, for example, cholesteric liquid crystal, a light absorption layer 104 provided inside the liquid crystal layer 103, a photoconductive layer 105 provided between the light absorption layer 104 and the transparent electrode 102B on the side of the back 100b, the photoconductive layer 105 with the resistance value lessening as image light A is applied, and an extension part 106 connected at one end to the transparent electrode 102A. In the exemplary embodiment, the display layer is a single layer, but display layers having different reflection colors can also be deposited between the transparent electrode and the substrate described above. In this case, each display layer may be placed between a transparent electrode and a substrate or the display layers may be directly deposited on each other and may be sandwiched between a transparent electrode and a substrate.

The cholesteric liquid crystal can be encapsulated into microcapsules and dispersed in a resin binder; spherical liquid crystal drops can be directly dispersed in a resin binder; or the liquid crystal can be filled into a structure put into cells of a given size by resin partitions. In so doing, the mechanical strength is enhanced while the flowability of the display layer is limited, so that the display image is hard to change with an external pressure or a stress of flexing, etc.

The substrate 101B on the side of the back 101b is provided with a pair of openings 108a and 108b and the power receiving terminal 107A is provided on the extension part 106 of one opening 108a and the power receiving terminal 107B is provided on the transparent electrode 102B of the other opening 108b.

The photoconductive layer 105 is made up of two charge generation layers 105a and 105c and a charge transport layer 105b provided therebetween. The charge generation layers 105a and 105c are deposited on both sides of the charge transport layer 105b, so that it is made possible to apply AC voltage to the liquid crystal layer 103, degradation of the liquid crystal layer 103 can be suppressed, and low drive voltage and long life of the optical write type electronic paper 100 can be realized.

It is advisable to adopt a double-spread binder-like terminal configuration for the display record medium terminal 10 as shown in FIG. 1. In FIG. 1, the right display section 11 has a screen with a touch panel for selecting information. An LCD, an EL display, etc., used as a usual PC monitor, etc., can be used as the screen. The display section 11 functions as an information selection module for selecting information to be displayed on the optical write type electronic paper 100 out of the information database 20 described later together with a predetermined program for controlling the operation of the display section 11.

An information menu arranging the title names of information stored in the information database 20, icons indicating the information, etc., is displayed on the screen of the display section 11, enabling the user to select any desired information out of the information menu. The screen of the display section 11 corresponds to a display module for displaying the information menu. To select an entry out of the information menu, the user can touch an icon on the screen or use the digital pen 16, etc. In addition, cursor keys may be provided for enabling the user to select an entry. The digital pen 16, etc., corresponds to a selection module for enabling the user to select any desired information out of the information menu.

A write section 12 on the left in FIG. 1 in the display record medium terminal 10 is joined to the display section 11 in one piece so that it can be opened and closed, and the optical write type electronic paper 100 can be attached to and detached from the write section 12. The write section 12 has an exposure face on which the optical write type electronic paper 100 is to be put. If the user selects the information to be written onto the optical write type electronic paper 100 according to the display section 11 and gives a predetermined write command with the optical write type electronic paper 100 put on the exposure face, the information is converted into print image data.

In the write section 12, a bias voltage is applied to the optical write type electronic paper 100 while pattern light of the print image is applied to the optical write type electronic paper 100 and consequently the print image of the information is instantaneously written onto the optical write type electronic paper 100. Thus, the write section 12 functions as an information rewrite module for rewritably writing the information selected through the information selection module onto the optical write type electronic paper 100 together with a predetermined program for controlling the operation of the write section 12.

Figure 4:
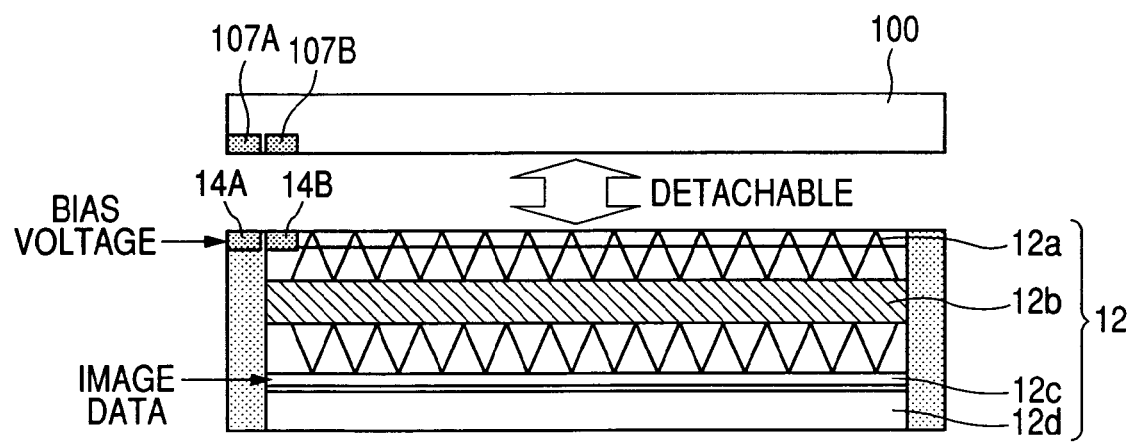
FIG. 4 is a configuration drawing to schematically show a write section corresponding to an information rewrite module in a display record medium terminal of the information presentation system according to the first exemplary embodiment of the invention.

A configuration centering on a thin light exposure system is adopted for the write section 12 as shown in FIG. 4, whereby the write section 12 (the display record medium terminal 10) is suited for the use of the exemplary embodiment because the display record medium terminal 10 (the write section 12) is provided with excellent portability and can be used as it is placed flat on a desk at the face-to-to communication time. The write section 12 is made up of a transparent support section 12a forming an exposure face, a two-dimensional microlens array 12b, a liquid crystal panel 12c, and a backlight 12d deposited on each other in order from the top layer to the bottom layer. The exposure face of the write section 12 forms a light exposure module of an image.

The write section 12 applies a two-dimensional light pattern from the liquid crystal panel 12c through the two-dimensional microlens array 12b onto the photoconductive layer 105 of the optical write type electronic paper 100 (see FIG. 3) put on the transparent support section 12a so as to form an image on the photoconductive layer 105, causes a resistance distribution based on the light pattern to occur on the photoconductive layer 105, applies a voltage between the transparent electrodes 102A and 102B, applies a partial pressure distribution based on the resistance distribution of the photoconductive layer 105 to the display layer, and writes the image responsive to the partial pressure distribution to the display layer.

The write section 12 is provided on the upper end side with a reader 13 for reading an RFID tag 120 at a position at which the RFID tag 120 overlaps the reader 13 when the optical write type electronic paper 100 is put on the write section 12. Further, the write section 12 is provided on the upper end side with a pair of feeding terminals 14A and 14B at a position at which the pair of power receiving terminals 107A and 107B overlaps the pair of feeding terminals 14A and 14B when the optical write type electronic paper 100 is put on the write section 12. The pair of feeding terminals 14A and 14B makes up a voltage application module.

As shown in FIG. 1, the information database 20 and the manipulation history database 30 of external storage that can transfer information to and from the display record medium terminal 10 via a wireless or wire communication line are connected to the display record medium terminal 10. Alternatively, the display record medium terminal 10 may be provided with internal local memory 15 implemented as all or parts of the information database 20 and the manipulation history database 30. The information database 20 stores various pieces of information to be displayed on the optical write type electronic paper 100 and allows information to be added, rewritten, and erased, needless to say.

When the information to be displayed on the optical write type electronic paper 100 through the display section 11 is selected out of the information database 20 or to write information to the optical write type electronic paper 100 by the write section 12, the ID (unique identifier) of the optical write type electronic paper 100 and the information to be written are retained in the manipulation history database 30 in association with each other. Thus, the manipulation history database 30 functions as a history storage module for recording the history of the information written to the optical write type electronic paper 100 by the write section 12 in association with the ID of the optical write type electronic paper 100 together with a predetermined program for controlling recording in the manipulation history database 30.

Not only the history of the information written to the optical write type electronic paper 100 and the ID of the optical write type electronic paper 100, but also the descriptions and the history of selective manipulations of the user on the optical write type electronic paper 100 displaying information are recorded in the manipulation history database 30. The selective manipulations of the user on the optical write type electronic paper 100 displaying information and a manipulation detection module for detecting manipulation are as follows:

In addition to a module for detecting the write manipulation history of writing selected information to the optical write type electronic paper 100 in the predetermined program for controlling the operation of the write section 12 (print software, etc.), for example, a module for reading the ID of the optical write type electronic paper 100 to which additional write manipulation is applied through the reader 13 provided in the write section 12 when the user performs additional write manipulation of handwriting onto the optical write type electronic paper 100 on which information is written an displayed, referencing the manipulation history database 30 previously recording the correspondence between the ID and written information, and determining the additional write manipulation to the information or the like can be named specifically.

Further, a module for detecting manipulation of selecting optical write type electronic paper 100 to which information utilized in face-to-face communications is written from among sheets of optical write type electronic paper 100 to which various pieces of information are written, reading the selected optical write type electronic paper 100 through the reader 13, and selecting particularly important information or the like can also be named specifically.

Next, the operation of the information presentation system according to the exemplary embodiment is as follows:

In FIG. 1, the information presentation system reads various pieces of information to be utilized at the time of an interview or a business talk as face-to-face communications from the information database 20 stored in the local memory 15 installed in the display record medium terminal 10 or the information database 20 in the external storage connected to the display record medium terminal 10 via a wire or wireless communication line and displays an information menu on the screen of the display section 11 on the right of the display record medium terminal 10. The user can select any actually used information out of the information menu.

The information selected on the display section 11 is transmitted to the write section that can be opened and closed relative to the display section 11 on the left of the display section 11, and is rewritably written to the optical write type electronic paper 100 by the write section 12 based on predetermined operation (command) of the user. More particularly, as shown in FIG. 4, the write section 12 applies a two-dimensional light pattern from the liquid crystal panel 12c through the two-dimensional microlens array 12b onto the photoconductive layer 105 of the optical write type electronic paper 100 (see FIG. 3) put on the transparent support section 12a so as to form an image on the photoconductive layer 105. The write section 12 causes a resistance distribution based on the light pattern to occur on the photoconductive layer 105, applies a voltage between the transparent electrodes 102A and 102B, applies a partial pressure distribution based on the resistance distribution of the photoconductive layer 105 to the display layer, and can write the image responsive to the partial pressure distribution to the display layer.

According to the write section 12, while a voltage is applied to the whole of the top and bottom transparent electrodes 102A and 102B, image information is exposed to light like a plane, whereby the image information can be printed (written) and thus it is made possible to write large-capacity image information at high speed as compared with line exposure, scanning exposure, etc. As a module for generating an image-like light pattern, for example, a self luminous display such as an EL display may be used in addition to the configuration using the liquid crystal panel 12c and the backlight 12d in combination shown in FIG. 4. Not only the method of forming an image of the image-like light pattern through the two-dimensional microlens array 12b, but also a method of projecting emitted light from a light emission panel displaying an image directly onto the optical write type electronic paper 100 for exposure to light or the like can also be used as a thin light exposure system.

Further, the write operation of information (image) on the optical write type electronic paper 100 will be discussed. In FIG. 3, when a pulse voltage is applied between the pair of the transparent electrodes 102A and 102B through the pair of power receiving terminals 107A and 107B and image light A is applied to the back 100b, the image light A is applied through the substrate 101B and the transparent electrode 102B to the photoconductive layer 105. As the image light A is applied to the photoconductive layer 105, the resistance value of the photoconductive layer 105 lessens and accordingly the partial pressure of the liquid crystal layer 103 determined by the impedance ratio to the photoconductive layer 105 increases and a voltage exceeding a given or more threshold value is applied and then the liquid crystal layer 103 is held in a state in which the light reflectivity in the liquid crystal layer 103 is large.

Therefore, when the optical write type electronic paper 100 is viewed from the surface 100a, the area to which the image light A is applied is seen white if illumination light is received and is reflected on the liquid crystal layer 103 and the wavelength of the reflected light distributes widely in the visible range. In contrast, in the area to which the image light A is not applied, the resistance value of the photoconductive layer 105 grows and a voltage not exceeding the threshold value is applied to the liquid crystal layer 103 and then the liquid crystal layer 103 is held in a light transmission state. The light passing through the liquid crystal layer 103 is absorbed in the light absorption layer 104 and thus the area to which the image light A is not applied is seen black.

Further, since the cholesteric liquid crystal has a characteristic of interference reflecting of color light responsive to helical pitches, the liquid crystal layer 103 made of the cholesteric liquid crystal is formed by depositing liquid crystal materials different in helical pitch, so that it is also possible to realize color display as a simple structure.

The once recorded image is maintained with no power supply, but an erasion voltage is applied to the power receiving terminals 107A and 107B as required, whereby the displayed image information can also be easily erased and a new image can be repeatedly written and erased for reusing the optical write type electronic paper 100 again and again. Since the optical write type electronic paper 100 is opposite in the applying direction of the image light A and the viewing direction of the image, the user can immediately check the reflected image easy on the eyes, formed on the surface 100a of the optical write type electronic paper 100 without being dazzled by unnecessary write light at the image writing time.

Thus, the optical write type electronic paper 100 to which an information image is written can be easily detached from the write section 12 of the display record medium terminal 10, so that the user can remove the optical write type electronic paper 100 from the write section 12 and can pass the optical write type electronic paper 100 to a person facing the user and can write information across pages requiring a comparison to two or more sheets of optical write type electronic paper 100 and can view the information with the sheets of optical write type electronic paper 100 placed side by side.

When early selected information is written to the optical write type electronic paper 100, the ID of the optical write type electronic paper 100 and the written information can be retained in the manipulation history database 30 in association with each other before or after. The history information associating the ID of the optical write type electronic paper 100 and the written information with each other may be retained not only in the manipulation history database 30 of the external storage connected in a wired or wireless manner, but also in the local memory 15 installed in the display record medium terminal 10.

Here, the recording operation of retaining the history information in the manipulation history database 30 can be set by a predetermined program specifically, for example, so that it is performed when the information is written or when the optical write type electronic paper 100 is detached from the write section 12 after the information is written. The point in time when the optical write type electronic paper 100 is detached from the write section 12 can be easily detected, for example, as the pair of power receiving terminals 107A and 107B comes in contact, non contact with the pair of feeding terminals 14A and 14B.

Figure 5:
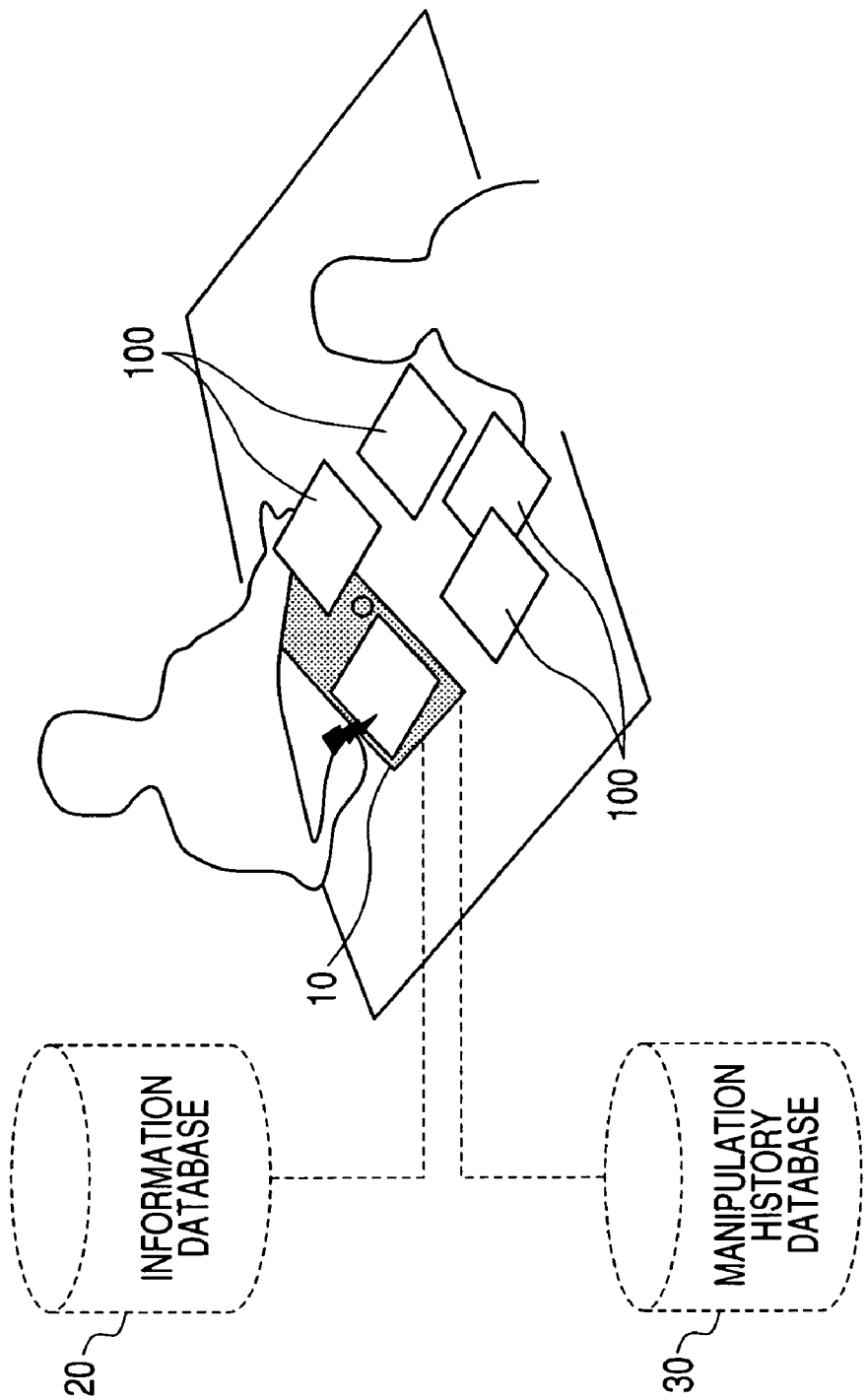
FIG. 5 is a schematic representation to show a face-to-face communication scene using the information presentation system according to the first exemplary embodiment of the invention.

In FIG. 5, a digital pen 16 which has ink (white board pen, etc.) capable of displaying and erasing handwriting on a smooth plane such as a plastic film (equivalent to the substrate 101A) at a pen point and further can digitize handwriting can be used to add a comment or a memo relevant to the displayed information to the optical write type electronic paper 100 to which the information is written. Thus, it is made possible to provide an information medium having a high affinity for the user (client) for enabling the user to easily and smoothly process information in such a manner to write a comment, a correction, a modification, etc., to information displayed on the optical write type electronic paper 100 and write future action items, etc., at the face-to-face communication time.

Not only the history of the information written to the optical write type electronic paper 100 and the ID of the optical write type electronic paper 100, but also the descriptions and the history of selective manipulations of the user on the optical write type electronic paper 100 displaying information are recorded in the manipulation history database 30. That is, the information to which handwriting is added as described above can also be determined more utilized information at the face-to-face communication time and thus may be detected by a manipulation detection module of an electronic sensor, a CCD (charge-coupled device) sensor, any other pressure sensitive sensor, an ultrasonic sensor, etc., for sensing handwriting of the digital pen 16, for example, and then additional write history information may also be stored and managed in association with the additional write information.

Specifically, when the user performs additional write manipulation of handwriting to the optical write type electronic paper 100, the ID of the optical write type electronic paper 100 to which the handwriting is added is read through the reader 13 installed in the write section 12 and the manipulation history database 30 previously recording the correspondence between the ID and written information is referenced. If the manipulation is determined the additional write manipulation to the information, the additional write history information may be recorded in the manipulation history database 30 together with the additional write description detected by the various sensors mentioned above. At this time, if the correspondence between the ID of the optical write type electronic paper 100 and written information is once stored in memory of the digital pen 16 and is transferred later when the display record medium terminal 10 is connected to the manipulation history database 30 in a wired manner, data recording is simplified; however, if the data is recorded whenever necessary with the display record medium terminal 10 wirelessly connected to the manipulation history database 30, it is made possible to transmit information in real time.

A data conversion module for converting a handwritten image added to the display area of the optical write type electronic paper 100 with the digital pen 16 with the optical write type electronic paper 100 put on the write section 12 into digital data, for example, may be installed on the write section 12 of the display record medium terminal 10. The digital data provided by the data conversion module can also be recorded in association with the history of the information written to the optical write type electronic paper 100 and the ID of the optical write type electronic paper 100.

The specific module of additional write manipulation is not limited to the digital pen 16; for example, if a battery and memory are installed in the optical write type electronic paper 100 and an input operation device for enabling marking manipulation, etc., on a part of information, for example, is provided on the optical write type electronic paper 100, information output from the input operation device is detected, whereby history information of the manipulation with the input operation device may be stored and managed together in association with the description of the manipulation with the input operation device.

Alternatively, only the action of the user selecting one from among sheets of optical write type electronic paper 100 displaying the information, namely, for example, picking up and putting it on the write section 12 may be grasped as selective manipulation of the user on the optical write type electronic paper 100. In this case, a contact detection sensor of a passive RF element circuit for receiving an external electromagnetic wave as supply of power in a non-contact manner and returning a response signal to a transmitted signal and an input operation device are installed in one piece on the optical write type electronic paper 100 as a section for detecting the action of the user picking up the optical write type electronic paper 100 or the like. As an alternative method, the single reader 13 for selectively reading the ID of the optical write type electronic paper 100 serves as manipulation detection module.

Further, as another manipulation history, the IDs of sheets of optical write type electronic paper 100 may be electrically read in a non-contact manner in such a manner that the user selects particularly important information only from among pieces of information once displayed on the optical write type electronic paper 100 and puts the sheets of electronic paper containing the selected information on the write section 12 in a bundle state or brings them close to the reader 13 installed in the write section 12. Thus, the sheets of optical write type electronic paper 100 displaying actually utilized information in the face-to-face communication scene can be grasped as a new unit and this unit can also be recorded and utilized as information concerning selective manipulation of the user.

Various manipulations, manipulation descriptions, and manipulation histories as described above are also stored in the manipulation history database 30 in association with the history of the information written to the optical write type electronic paper 100 and the ID of the optical write type electronic paper 100 described above, whereby the records can be used for various uses and can also be utilized for the use of simplifying the labor and time for instantly calling information at a later interview time particularly to smooth face-to-face communications.

Figure 6:
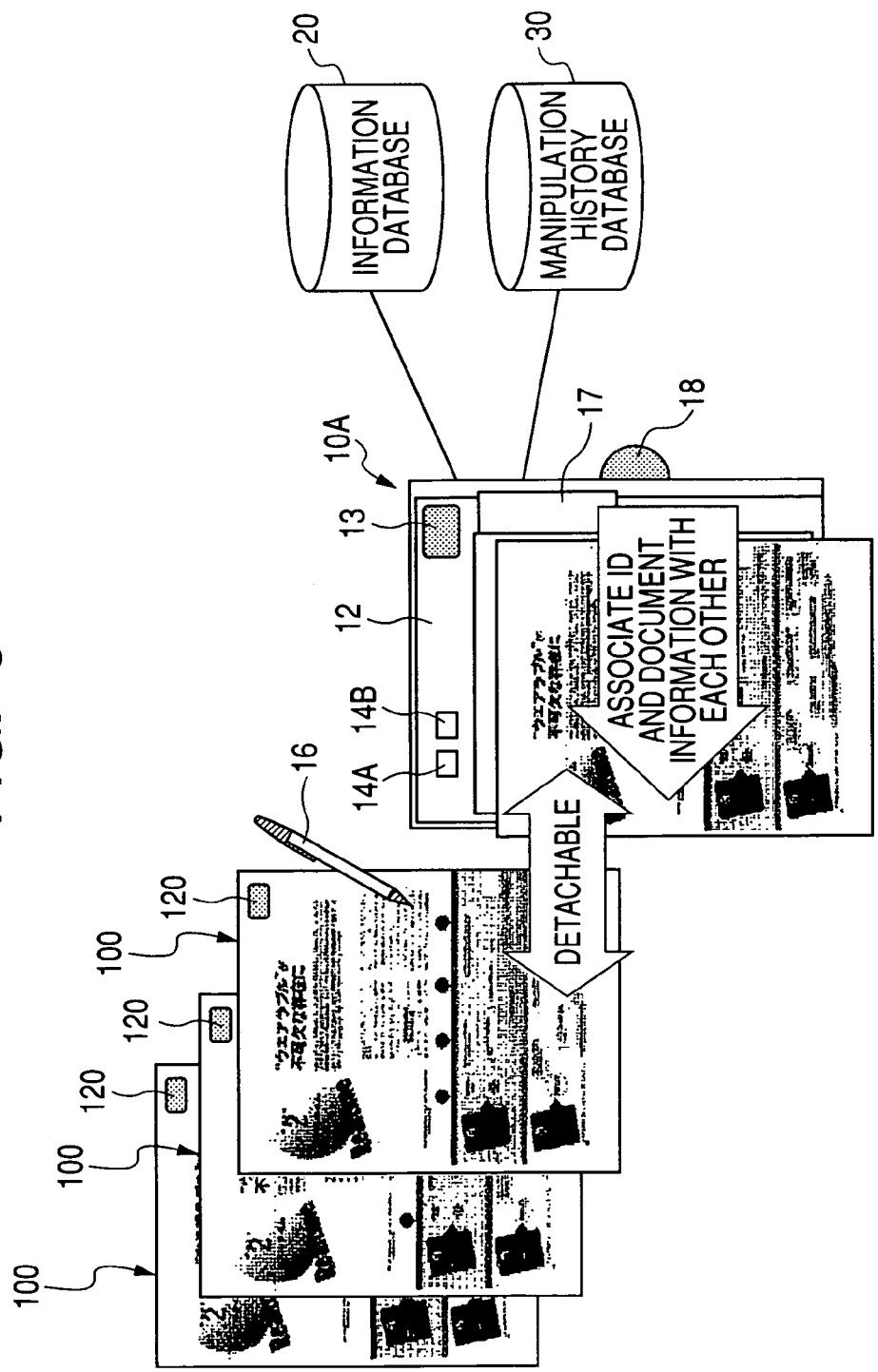
FIG. 6 is a configuration drawing to schematically show the whole of an information presentation system according to a second exemplary embodiment of the invention.

FIG. 6 shows a second exemplary embodiment of the invention.

In the exemplary embodiment, a display record medium terminal 10A forming the basis of an information presentation system is provided by simplifying and miniaturizing the configuration of the display section 11 of the display record medium terminal 10 described above and installing the display section 11 substantially at one end of a write section 12 as an attachment.

In the exemplary embodiment, an information selection module for the user to select the information to be displayed on optical write type electronic paper 100 is made up of a menu screen 17 provided at one end of the write section 12 and a selection UI device 18 for the user to select any desired information out of an information menu displayed on the menu screen 17.

According to the configuration of the information presentation system according to the second exemplary embodiment, the display record medium terminal 10A is more simplified and miniaturized and it is also possible to reduce the manufacturing cost of the whole information presentation system. Parts similar to those of the first exemplary embodiment are denoted by the same reference numerals in FIG. 6 and will not be discussed again.

In the exemplary embodiments described above, for example, the information selection module for the user to select information displayed on the optical write type electronic paper 100 may be set so as to enable the user to search for information recorded in the past in association with the optical write type electronic paper 100 based on the ID thereof.

In the exemplary embodiment described above, the ID (unique identifier) is given to the optical write type electronic paper 100. However, for example, the ID may also be given to the user and the user ID and the information or the history information and the manipulation information may be stored in the information database 20 and the manipulation history database 30 in association with each other. In this case, a user ID acquisition section is additionally provided in a proper part of the display record medium terminal 10, 10A.

The user ID specifically can be entered by the user using a keyboard, etc., or can be acquired using a magnetic card, an IC card, etc., different from the optical write type electronic paper 100. Alternatively, a mobile telephone can also be operated for displaying authentication information on the screen of the display section 11 and acquiring the display information. If the user ID is authenticated in the display record medium terminal 10 and authentication is granted, the user ID and the information stored in the information database 20 and the manipulation history database 30 may be displayed on the screen of the display section 11 in association with each other.

As the display record media that can be adopted in the exemplary embodiments, not only the optical write type electronic paper 100 described above, but also a display record medium electrically driven by a pixel electrode can be adopted. In this case, the information rewrite module is formed of a module for controlling energization of the electrode. Specifically, for example, a toner display system of encapsulating charged color particles that can be flied in the presence of an electric field in gas, an electrophoretic display system of scattering charged particles in an insulting liquid, or a display technology of a configuration for applying a voltage and driving cholesteric liquid crystal material, etc., by a matrix electrode or a discrete pixel electrode can also be used.

Further, if a display record medium of the type wherein pixels are selectively written electrically as described above is used, the exemplary embodiment is characterized by the fact that the display record medium is provided with only drive electrodes or a part of a drive circuit and a power supply section and a signal supply section of the main components of image rewrite module are made detachable. According to the configuration, it is made possible to display a plurality of pieces of information at the same time on a plurality of display record media to enhance the listing property of information and enable the user to easily compare and examine the descriptions.

FIGS. 7 to 15 are drawings to describe a third exemplary embodiment of the invention.

The third exemplary embodiment is configured so as to contain the first and second exemplary embodiments described above. Parts similar to those of the first or second exemplary embodiment are denoted by the same reference numerals in the third exemplary embodiment and will not be discussed again. However, if the same reference numeral is assigned, the part to which a partial function is added, etc., will be discussed additionally.

The system is not only a system made up of a plurality of computers, hardware, units, etc., connected by a network, etc., but also a system implemented as one computer.

Figure 7:
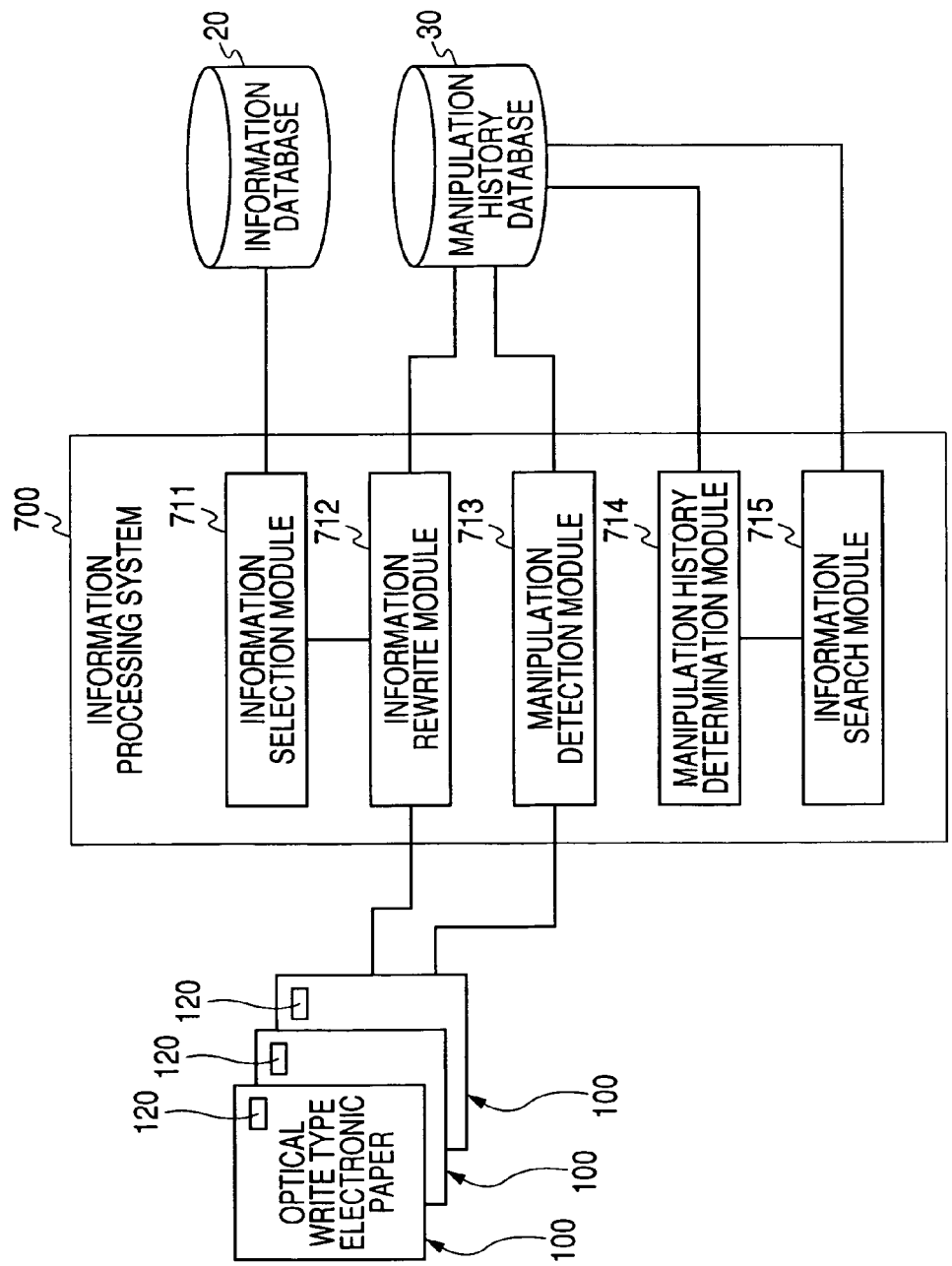
FIG. 7 is a diagram to show modules of an information processing system according to a third exemplary embodiment of the invention.
Figure 8:
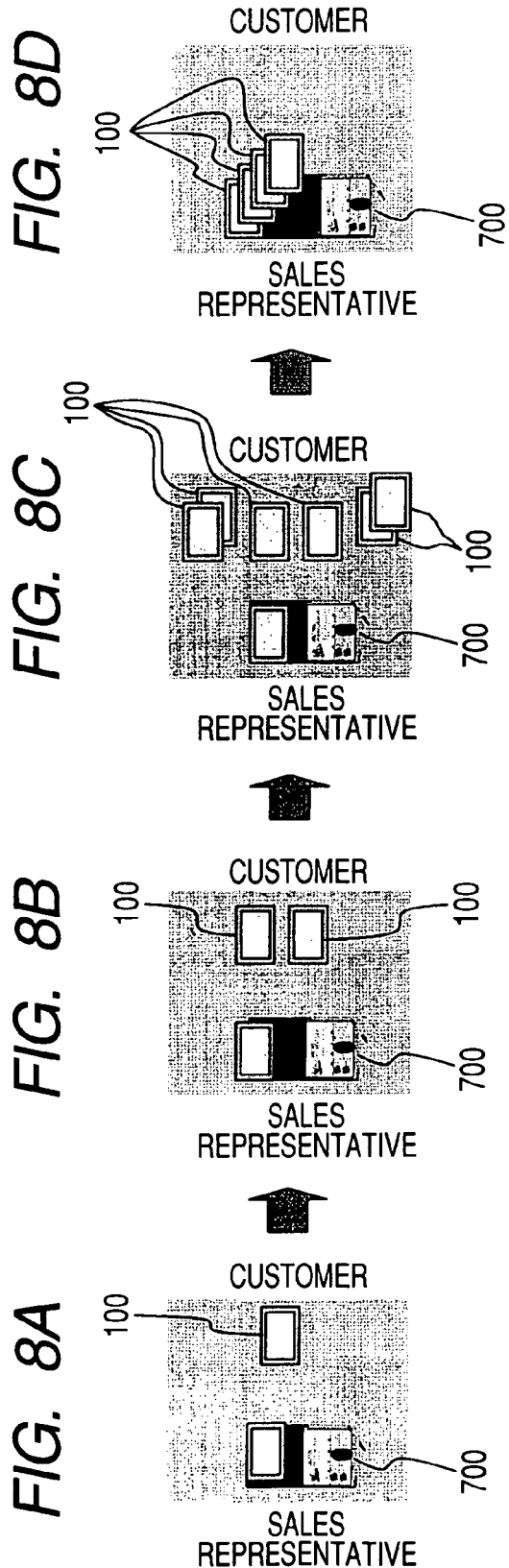
FIGS. 8A to 8D are drawings to describe use of the information processing system in an interview scene.

An information processing system 700 is implemented in the above-described display record medium terminal 10 or a computer, for example, a general-purpose PC (personal computer). In FIG. 7, an information database 20 and a manipulation history database 30 are placed outside the information processing system 700, but may be placed inside the information processing system 700 and may exist in the display record medium terminal 10 or the PC cabinet. An information selection module 711 corresponds to the display section 11 of the above-described display record medium terminal 10, an information rewrite module 712 corresponds to the write section 12 of the above-described display record medium terminal 10, and a manipulation detection module 713 is similar to the manipulation detection module described in the first exemplary embodiment.

The manipulation history database 30 records the history of information written to optical write type electronic paper 100 by the information rewrite module 712 and the history of manipulations detected by the manipulation detection module 713 in association with the unique identifier of the optical write type electronic paper 100. That is, an RFID tag 120 is added to each optical write type electronic paper 100 and the unique identifier capable of identifying the optical write type electronic paper 100 is stored in the RFID tag 120. Therefore, the history of information written to optical write type electronic paper 100 can be stored in association with the identifier stored in the RFID tag 120 added to the optical write type electronic paper 100. The history of manipulations on information displayed on optical write type electronic paper 100 is detected by the manipulation detection module 713 and can be stored in association with the identifier stored in the RFID tag 120 added to the optical write type electronic paper 100.

A manipulation history determination module 714 is provided for the user to determine any manipulation history out of a list of the manipulation histories on the optical write type electronic paper 100 recorded in the manipulation history database 30. More specifically, the list of the manipulation histories on the optical write type electronic paper 100 recorded in the manipulation history database 30 is output in a classification format by manipulation type. Alternatively, the list of the manipulation histories on the optical write type electronic paper 100 recorded in the manipulation history database 30 is output in a classification format by number of manipulation times in units of optical write type electronic paper 100 or information written to optical write type electronic paper 100. Further alternatively, the list of the manipulation histories on the optical write type electronic paper 100 recorded in the manipulation history database 30 is output in a classification format by a time of the manipulation.

An information search module 715 searches the manipulation history database 30 for at least any of the history of information written to the optical write type electronic paper 100 associated with the manipulation history in response to the manipulation history determined according to the manipulation history determination module 714, another manipulation history on the optical write type electronic paper 100, or the unique identifier of the optical write type electronic paper 100.

Figure 15:
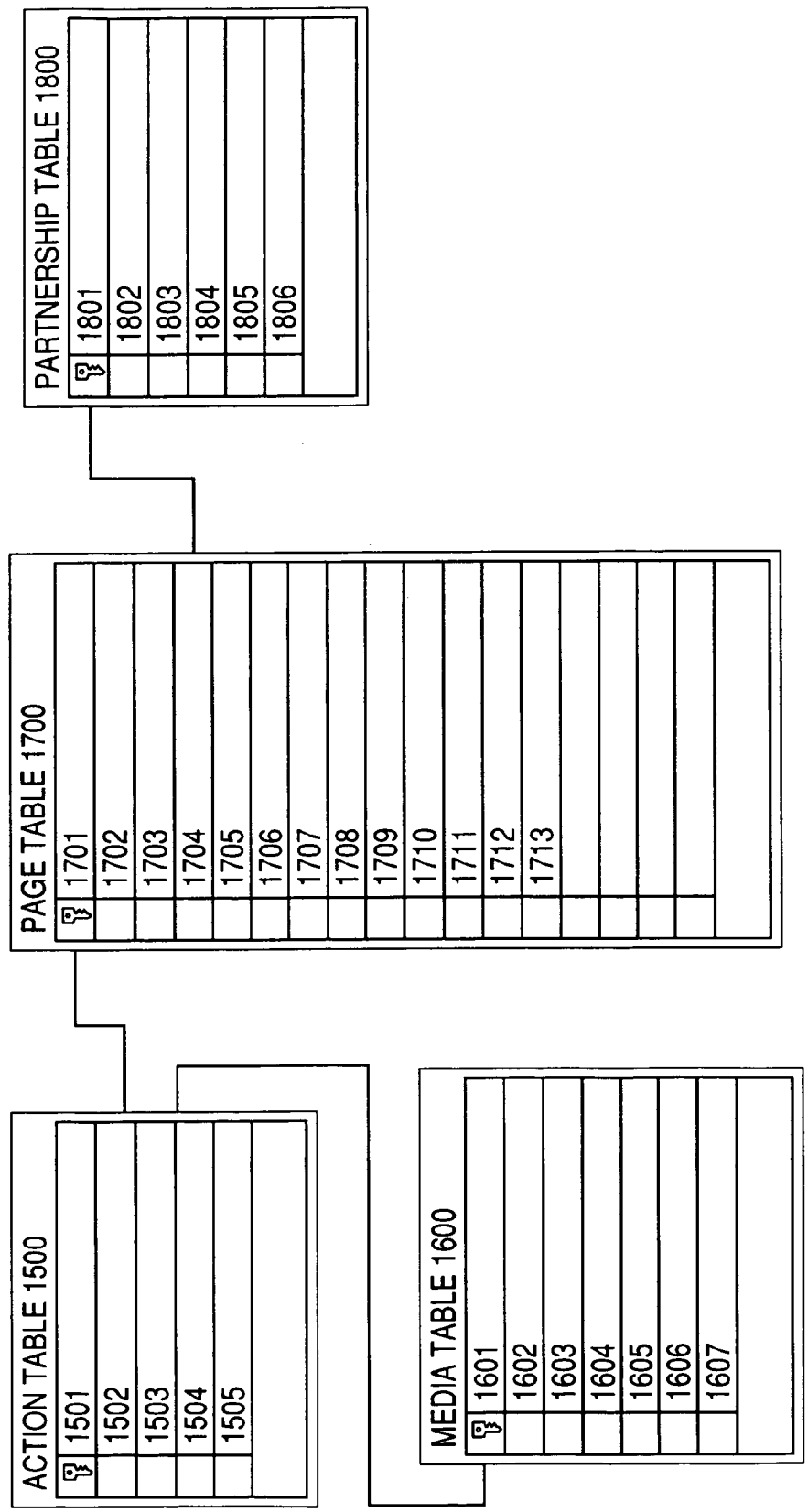
FIG. 15 is a drawing to show a data structure example in the third exemplary embodiment of the invention.

An example of data structures handled by the system will be discussed with FIG. 15. Four tables of an action log table 1500, a media table 1600, a page table 1700, and a partnership table 1800 are included. The action log table 1500 is a table for managing generated manipulation data. The media table 1600 is a table for managing the current page displayed on optical write type electronic paper 100. The page table 1700 is a table for managing data separated in page units of a document made up of a plurality of pages. The partnership table 1800 is a table for managing partnerships (projects). The tables are stored in the manipulation history database 30. When an interview, etc., using the information processing system 700 is held, the history of the interview, etc., is stored in the tables. The manipulation history determination module 714 and the information search module 715 use the manipulation history as a search key and search for the history of information written to the optical write type electronic paper 100 associated with the manipulation history, another manipulation history on the optical write type electronic paper 100, or the unique identifier of the optical write type electronic paper 100.

The action log table 1500 is made up of five fields of 1501 to 1505. The media table 1600 is made up of seven fields of 1601 to 1607. The page table 1700 is made up of 13 fields of 1701 to 1713. The partnership table 1800 is made up of sixth fields of 1801 to 1806.

The tables are linked with each other. That is, the ID of the action log table 1500 is stored in the 1501 field, the ID of the media table 1600 is stored in the 1601 field, the ID of the page table 1700 is stored in the 1701 field, and the ID of the partnership table 1800 is stored in the 1801 field. The 1503 field of the action log table 1500 points to the ID of the page table 1700 and the 1504 field of the action log table 1500 points to the ID of the media table 1600. The 1704 field of the page table 1700 points to the ID of the partnership table 1800. Therefore, from the action log table 1500, the media table 1600 and the page table 1700 can be accessed and the partnership table 1800 can be accessed via the page table 1700.

The action log table 1500 is a table for managing generated manipulation data.

The 1501 field stores the record identifier of the action log table.

The 1502 field stores the action classification. The classification includes the following six categories:

(1) Paging: Manipulation of separating a plurality of documents into pages and generating a plurality of pages (2) View: Manipulation of selecting a page and scaling up display of the page (3) Print: Manipulation of writing selected page to optical write type electronic paper 100

(4) View: Manipulation of identifying optical write type electronic paper 100 and displaying a relevant page on a computer (5) Draw: Manipulation of adding handwriting to selected page (6) Grouping: Manipulation of identifying sheets of optical write type electronic paper 100 and bundling relevant pages to generate a new document made up of a plurality of pages The 1503 field stores the record identifier of the page table. Accordingly, the action log table 1500 can be linked with the page table 1700.

The 1504 field stores the record identifier of the media table. Accordingly, the action log table 1500 can be linked with the media table 1600.

The 1505 field stores the record creation date and time.

The media table 1600 is a table for managing the current page displayed on optical write type electronic paper 100.

The 1601 field stores the record identifier of the media table.

The 1602 field stores the name of the medium (display medium).

The 1603 field stores the identifier of the device.

The 1604 field stores the record identifier of the page table.

The 1605 field stores the cumulative number of reference times by manipulation.

The 1606 field stores the record creation date and time.

The 1607 field stores the last reference date and time by manipulation.

The page table 1700 is a table for managing data separated in page units of a document made up of a plurality of pages.

The 1701 field stores the record identifier of the page table.

The 1702 field stores the name of page.

The 1703 field stores the thumbnail image of files.

The 1704 field stores the record identifier of the partnership table. Accordingly, the page table 1700 can be linked with the partnership table 1800.

The 1705 field stores the record identifier of the page table on which page is based.

The 1706 field stores the computer identifier of computer in which program operates.

The 1707 field stores the storage location of image file in local computer.

The 1708 field stores the storage location of image file in server computer.

The 1709 field stores the storage location of document file on which creation of image file is based in local computer.

The 1710 field stores the storage location of newly generated document file from image file in local computer.

The 1711 field stores the cumulative number of reference times by manipulation.

The 1712 field stores the record creation date and time.

The 1713 field stores the last reference date and time by manipulation.

The partnership table 1800 is a table for managing partnerships (projects).

The 1801 field stores the record identifier of the partnership table.

The 1802 field stores the name of partnership.

The 1803 field stores the name of the person in charge.

The 1804 field stores the name of customer.

The 1805 field stores the creation date and time.

The 1806 field stores the update date and time.

To create a manipulation history list in the classification format by manipulation type, the manipulation history determination module 714 creates the list for each action category stored in the 1502 field (namely, the six categories of (1) Paging, (2) View, (3) Print, (4) View, (5) Draw, and (6) Grouping).

To create a manipulation history list in the classification format by number of manipulation times in units of optical write type electronic paper 100, the manipulation history determination module 714 creates the list based on the media ID stored in the 1504 field.

To create a manipulation history list in the classification format by number of manipulation times in units of information written to optical write type electronic paper 100, the manipulation history determination module 714 creates the list based on the page ID stored in the 1503 field.

To create a manipulation history list in the classification format by manipulation time, the manipulation history determination module 714 creates the list based on the 1505 field.

Next, the operation of the information processing system 700 according to the exemplary embodiment is as follows:

To begin with, the scene of an interview between a sales representative and a customer using the exemplary embodiment will be discussed with FIGS. 8A to 8D. FIGS. 8A to 8D show that the sales representative and the customer face each other with a desk between and represents the information processing system 700 and optical write type electronic paper 100 placed on the desk.

(1) The sales representative makes preparations for the material to be used in the interview. The sales representative outputs explanatory material to optical write type electronic paper 100 or paper or retains a digital document in a server (or a memory card).

(2) The sales representative explains the material for the customer using the optical write type electronic paper 100 or paper (see FIG. 8A).

(3) The customer requests the sales representative to present relevant information and then the sales representative searches for information, outputs the found information to optical write type electronic paper 100, and presents it to the customer (see FIG. 8B).

(4) The customer selects and views interesting optical write type electronic paper 100 and handwrites on optical write type electronic paper 100 and has a conversation with the sales representative. At this time, the sales representative handwrites a memo of the conversation on optical write type electronic paper 100 or handwrites a memo on a paper notebook. ((2) and (3) are repeated (see FIG. 8C.)

(5) At the end of the interview, the sales representative agrees and confirms the determination items of the customer. Important optical write type electronic paper 100 is input to the information processing system 700 and the digital document is arranged. At the beginning of the next interview, the determination items are checked (see FIG. 8D).

(6) The sales representative and the customer bring back their respective documents and report to the persons concerned and examine the substance of the next interview.

Figure 9:
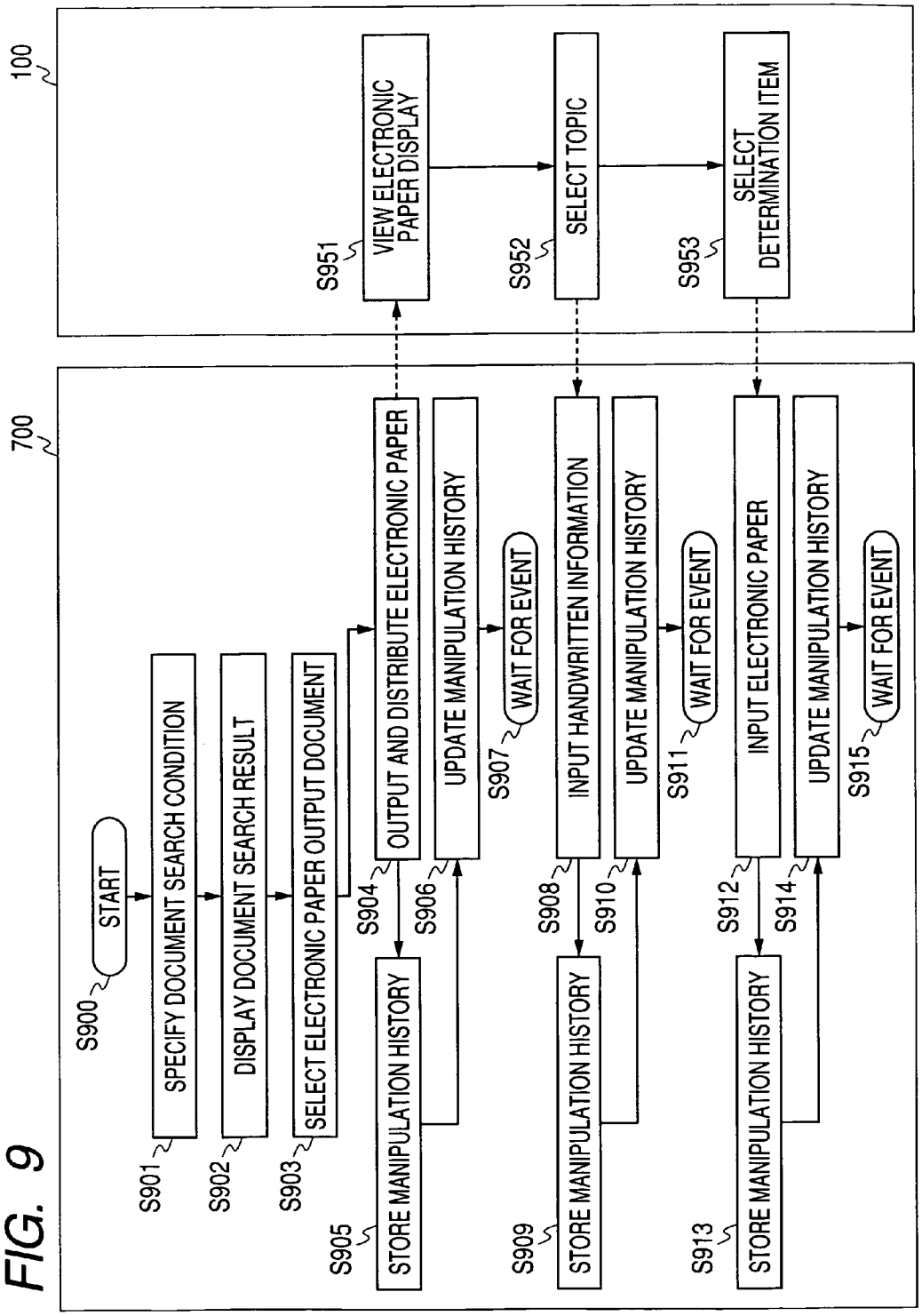
FIG. 9 is a flowchart of a processing example in the third exemplary embodiment of the invention.

A flow of processing executed between the information processing system 700 and optical write type electronic paper 100 will be discussed with FIG. 9.

In the information processing system 700, first at step S901, the operator specifies a document search condition.

At step S902, the information selection module 711 searches the information database 20 according to the search condition at step S901 and displays the result.

At step S903, since there is a possibility that a plurality of documents may be displayed as the search result at step S901, the operator selects the corresponding document from among the displayed documents.

At step S904, the information rewrite module 712 outputs the document selected at step S903 to optical write type electronic paper 100. The operator distributes the optical write type electronic paper 100 to a person with whom the operator interviews.

At step S905, the document and the unique identifier of the optical write type electronic paper 100 are stored in the manipulation history database 30 in association with each other as a manipulation history.

At step S906, the manipulation history stored in the manipulation history database 30 when the document and the identifier are stored at step S905 is updated by adding a new entry thereto.

At step S907, the information processing system 700 waits for an event until a new manipulation occurs.

On the other hand, at step S951, the person receiving the optical write type electronic paper 100 views the optical write type electronic paper 100.

At step S952, the person handwrites information onto the received optical write type electronic paper 100 with a digital pen 16, etc.

At step S908, handwriting information to the optical write type electronic paper 100 at step S952 from the event wait state is detected.

At step S909, the handwriting at step S908 and the unique identifier of the optical write type electronic paper 100 are stored in the manipulation history database 30 in association with each other as a manipulation history.

At step S910, the manipulation history stored in the manipulation history database 30 when the handwriting and the identifier are stored at step S909 is updated by adding a new entry thereto.

At step S911, the information processing system 700 waits for an event until a new manipulation occurs.

It is assumed that at step S953, the person selects the optical write type electronic paper 100 displaying important information from among sheets of optical write type electronic paper 100.

At step S912, from the event wait state, the operator of the information processing system 700 receives the selected optical write type electronic paper 100 from the person and inputs it to the information processing system 700.

At step S913, the event of the input and the unique identifier of the optical write type electronic paper 100 input at step S912 are stored in the manipulation history database 30 in association with each other as a manipulation history.

At step S914, the manipulation history stored in the manipulation history database 30 when the event of the input and the identifier are stored at step S913 is updated by adding a new entry thereto.

At step S915, the information processing system 700 waits for an event until a new manipulation occurs.

Next, a screen image of the information processing system 700 and optical write type electronic paper 100 used in an interview will be discussed with FIG. 14. The information processing system 700 has the same appearance as the display record medium terminal 10 in the first exemplary embodiment. However, the information processing system 700 has the enhanced storage and search functions as compared with the display record medium terminal 10 in the first exemplary embodiment. Of course, the information processing system 700 may be like the display record medium terminal 10A in the second exemplary embodiment.

The information processing system 700 adopts a double-spread binder-like terminal configuration and has a screen with a touch panel for selecting information in the display section on the right. The screen displays a document display area 1401, an attribute display area 1402, and a search condition setting area 1403.

The information stored in the information database 20 is displayed in the document display area 1401. In the description to follow, a document is taken as an example of information. In the display mode, a document page can also be displayed in a size as large as the actual document page using a full screen; a plurality of thumbnail images can also be displayed. When document thumbnail images are displayed, if the user taps the digital pen 16 on the document to be handled, the display mode switches to page view for displaying the document in a size as large as the actual document.

The attributes of the document selected in the document display area 1401 are displayed in the attribute display area 1402. For example, the name of the document, the creation date and time of the document, and the like are displayed.

The user can set a search condition in the search condition setting area 1403. For example, a search is made for the manipulation type and the manipulation time using a time period, etc.

In addition, an area for enabling the operator to select a manipulation icon by tapping the digital pen 16, etc., is provided for enabling the operator to start manipulation using the information processing system 700, such as "input document file," "switch view," "convert into electronic paper," "call document," "handwrite on document," or "bundle documents." The "input document file" manipulation is a manipulation of displaying the information stored in the information database 20 in the document display area 1401. The "switch view" manipulation is a manipulation of switching the display mode in the document display area 1401 between thumbnail view and page view. The "convert into electronic paper" manipulation is a manipulation of rewriting the document selected in the document display area 1401 onto the optical write type electronic paper 100 set on the left of the information processing system 700. When the user holds optical write type electronic paper 100 on the left of the main body of the information processing system 700, the "call document" manipulation is a manipulation of displaying a document relevant to the document displayed on the optical write type electronic paper 100 in the document display area 1401. The display of a relevant document contains display of the first page or the next page of the document displayed on the optical write type electronic paper 100, display of an explanatory document of used terms, etc. The "handwrite on document" manipulation is a manipulation of displaying the selected document in the document display area 1401 on an enlarged scale for enabling the user to handwrite. When the user holds sheets of optical write type electronic paper 100 on the left of the main body of the information processing system 700, the "bundle documents" manipulation is a manipulation of generating a new document made up of the pages (sheets).

The screen image in FIG. 14 is a representative illustration and various screen images can be displayed by an application program in the information processing system 700.

Next, examples of manipulations using the information processing system 700 and optical write type electronic paper 100 in an interview will be discussed with FIGS. 10 to 13.

First, a manipulation procedure example for outputting a document to optical write type electronic paper 100 will be discussed with FIGS. 10A to 10F. The user selects optical write type electronic paper 100 to write a document (see FIG. 10A). The user sets the optical write type electronic paper 100 on the left of the main body of the information processing system 700 (see FIG. 10B). The user uses the digital pen 16 to select a document B displayed as a thumbnail image in the document display area 1401 (see FIG. 10C). The first page of the document is displayed in the document display area 1401 of the information processing system 700 on an enlarged scale (see FIG. 10D). The user selects the "convert into electronic paper" icon using the digital pen 16 (see FIG. 10E). The document displayed in the document display area 1401 is output to the optical write type electronic paper 100 (see FIG. 10F). In this case, the manipulation "output of first page of document B" is stored in the manipulation history database 30 in association with the identifier of the optical write type electronic paper 100. The manipulation time, etc., is also stored.

A manipulation procedure example for outputting a document to optical write type electronic paper 100 will be discussed with FIGS. 11A to 11G. The second or later page of a document is output to optical write type electronic paper 100 in the manipulation procedure unlike the manipulation procedure in FIGS. 10A to 10F.

The first page of a document is output (see FIG. 11A). This is the same as the state in FIG. 10D. From the state in FIG. 11A, the user taps the digital pen 16 on a "next page" button on the bottom right of the information processing system 700 (see FIG. 11B). The second page as the next page is displayed (see FIG. 11C). After this, the user repeats tapping the digital pen 16 on the "next page" button until the page to be output to optical write type electronic paper 100 appears. The user selects the "convert into electronic paper" icon in a state in which the page to be output is displayed, whereby the desired page is output to the optical write type electronic paper 100. In this case, the manipulation "output of second page of document B," for example, is stored in the manipulation history database 30 in association with the identifier of the optical write type electronic paper 100. The manipulation time, etc., is also stored.

From the state in FIG. 11A, the user taps the digital pen 16 on a "close" button on the bottom right of the information processing system 700 (see FIG. 11D). Then, thumbnail images provided in a one-to-one correspondence of the pages of the document are displayed (see FIG. 11E). The user taps the digital pen 16 on any thumbnail image (see FIG. 11F). The page corresponding to the thumbnail image on which the digital pen 16 is tapped is displayed on an enlarged scale (see FIG. 11G). The user selects the "convert into electronic paper" icon in a state in which the page to be output (in this case, the third page) is displayed, whereby the desired page is output to the optical write type electronic paper 100. In this case, the manipulation "output of third page of document B" is stored in the manipulation history database 30 in association with the identifier of the optical write type electronic paper 100. The manipulation time, etc., is also stored.

A manipulation procedure example for calling a document using optical write type electronic paper 100 will be discussed with FIGS. 12A to 12G. For example, if the user wants to display another page of the document displayed on optical write type electronic paper 100 or wants to use the information processing system 700 to edit the page displayed on optical write type electronic paper 100, the user uses the manipulation procedure.

The user selects optical write type electronic paper 100 on which the document to be called is displayed. For example, the user selects optical write type electronic paper 100 on which the first page of a document A is displayed (see FIG. 12A). The user sets the selected optical write type electronic paper 100 on the left of the information processing system 700 (see FIG. 12B). The user taps the digital pen 16 on a "call" button displayed on the top right of the information processing system 700 (see FIG. 12C). Information (document ID, etc.) is read from the write section 12 of the optical write type electronic paper 100 and the original document is extracted from the information database 20 and is displayed in the document display area 1401 of the information processing system 700 (see FIG. 12D). From the state in FIG. 12D, the user taps the digital pen 16 on the target folder from search condition folder on the right of the document display (see FIG. 12E). The thumbnail and the attributes of the page matching the search condition are displayed (see FIG. 12F). In this case, the manipulation "calling first page of document A," "search" is stored in the manipulation history database 30 in association with the identifier of the optical write type electronic paper 100. The manipulation time, etc., is also stored.

From the state in FIG. 12D, the user uses the digital pen 16 to additionally handwrite the document displayed in the document display area 1401 of the information processing system 700 (see FIG. 12G). After this edit, the user selects the "convert into electronic paper" icon, whereby the edit page is output to the optical write type electronic paper 100. In this case, the manipulation "calling first page of document A," "handwriting edit" is stored in the manipulation history database 30 in association with the identifier of the optical write type electronic paper 100. The manipulation time, etc., is also stored.

A manipulation procedure example for document manipulation using optical write type electronic paper 100 will be discussed with FIGS. 13A to 13D, wherein sheets of optical write type electronic paper 100 are used and a new document is created from displayed pages. The user selects two or more sheets of optical write type electronic paper 100 to generate a document (in FIGS. 13A to 13D, three sheets of optical write type electronic paper 100 displaying the third page of a document C, the first page of a document B, and the fifth page of a document A are displayed. See FIG. 13A). The user sets the sheets of optical write type electronic paper 100 on the left of the information processing system 700 (see FIG. 13B). Then, information is read from the RFID tags 120 of the sheets of the optical write type electronic paper 100 and the fact that the third page of the document C, the first page of the document B, and the fifth page of the document A are input in an overlap manner is recognized. Since the closest page to the information processing system 700 is read first, the page order of the document to be created is the opposite order to the read order of the sheets of the optical write type electronic paper 100. Next, the information processing system 700 asks the user whether or not to generate a document (see FIG. 13C). If the user selects document generation, a new document made up of the three pages of the third page of the document C, the first page of the document B, and the fifth page of the document A is generated and a thumbnail image of the new document is displayed in the document display area 1401 of the information processing system 700 (see FIG. 13D). In this case, the manipulation "bundling third page of document C, first page of document B, and fifth page of document A in this order" is stored in the manipulation history database 30 in association with the identifier of the optical write type electronic paper 100. The manipulation time, etc., is also stored.

Various manipulations as shown in FIGS. 10A to 13D are detected by the manipulation detection module 713 and are stored in the manipulation history database 30. The data is stored in the manipulation history database 30 according to the data structure as previously described with reference to FIG. 15. The manipulation history determination module 714 displays a manipulation history list in the search condition setting area 1403 of the information processing system 700 using the action log table 1500, etc., for the data stored in the manipulation history database 30. The information search module 715 searches the manipulation history database 30 for data according to a user command. Accordingly, from the manipulation executed on the optical write type electronic paper 100 using the information processing system 700, etc., the document written to the optical write type electronic paper 100 associated with the history of the manipulation can be called. Accordingly, if the user bears the manipulation in mind although he or she does not bear the document in mind, it is made possible find out the document. Since a search can also be made for the history of other manipulations on the optical write type electronic paper 100, the user can later check what manipulation was performed before and after one manipulation. Further, a search can be made for the optical write type electronic paper 100 on which the manipulation was performed, so that it is made possible for the user to find out the optical write type electronic paper 100 used in the past interview from the manipulation memory of the user.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An information processing system for management of various pieces of information, the information processing system comprising:
    a plurality of rewritable display record medium devices, each display record medium device having a unique identifier;
    an information selection section that selects information to be displayed on one of the display record medium devices;
    an information rewrite section that rewritably writes the information selected by the information selection section to the one of the display record medium devices;
    a manipulation detection section that detects a selective manipulation of a first user on the one of the display record medium devices displaying the information;
    a history storage section that records a history of the information written to the one of the display record medium devices by the information rewrite section and a history of the manipulations detected by the manipulation detection section in association with the unique identifier of the one of the display record medium devices;
    a manipulation history determination section for a second user to select any manipulation history out of a list of histories of manipulations on the plurality of display record medium devices recorded in the history storage section; and
    an information search section that searches for, in response to the manipulation history determined by the manipulation history determination section, at least one of a history of the information written to a display record medium device associated with the manipulation history, a history of other manipulations on the display record medium device associated with the manipulation history and the unique identifier of the display record medium device associated with the manipulation history.

2. The information processing system according to claim 1, wherein the manipulation history determination section outputs the list of histories of the manipulations on the display record medium devices, recorded in the history storage section in a classification formation by manipulation type.

3. The information processing system according to claim 1, wherein the manipulation history determination section outputs the list of histories of the manipulations on the display record medium devices, recorded in the history storage section in a classification formation by number of manipulation times in units of the display record medium devices or information written to the display record medium devices.

4. The information processing system according to claim 1, wherein the manipulation history determination section outputs the list of histories of the manipulations on the display record medium devices, recorded in the history storage section in a classification formation by a time of the manipulation.

5. The information processing system according to claim 1, wherein the manipulation detection section comprises a section that selectively reads an identifier of the display record medium device selected by the first user from among the plurality of display record medium devices displaying information.

6. The information processing system according to claim 5, wherein the manipulation detection section that selectively reads the unique identifier of the one of the display record medium devices selected by the first user from among the plurality of display record medium devices displaying information reads electrically, electromagnetically or optically the unique identifiers of the plurality of display record media in a non-contact manner.

7. The information processing system according to claim 1, wherein the manipulation detection section comprises a section that detects at least one of: a selective additional write manipulation of the first user to a display record medium device displaying information to the first user; and a manipulation on an input operation device provided on the display record medium device displaying the information to the first user.

8. The information processing system according to claim 1, wherein the information selection section comprises:
    a display section that displays an information menu; and
    a selection section for the first user to select any entry out of the information menu.

9. The information processing system according to claim 1, wherein the history storage section can be set so as to conduct an operation of a recording when the one of the display record medium devices is detached from the information rewrite section.

10. The information processing system according to claim 1,
   wherein the one of the display record medium devices is an optical write type display record medium device, and
   wherein the information rewrite section comprises: a section that exposes an image to light; and
   a voltage application section.

11. The information processing system according to claim 1,
   wherein the one of the display record medium devices is a display record medium electrically driven by a pixel electrode, and
   wherein the information rewrite section comprises a section that controls energization of the pixel electrode.

12. The information processing system according to claim 1, which further comprises a handwrite input section that erasably adds a handwritten image onto a display area of the one of the display record medium devices,
   wherein the manipulation detection section comprises a section that detects at least additional write with the handwrite input section.

13. The information processing system according to claim 12, which further comprises a data conversion section that converts the handwritten image added onto the display area of the one of the display record medium device with the handwrite input section into digital data,
   wherein the history storage section also records the digital data provided by the data conversion section in association with the history of the information written to the one of the display record medium devices and the unique identifier of the one of the display record medium devices.

14. An information processing method for management of various pieces of information, the information processing method comprising:
   selecting information to be displayed on a rewritable display record medium device having a unique identifier;
   rewritably writing to and displaying the selected information on the display record medium device;
   detecting a selective manipulations of a first user on the display record medium device displaying information;
   recording a history of the information written to the display record medium device and a history of the detected manipulations in association with the unique identifier of the display record medium device, respectively;
   accepting a second user's selection of any manipulation history out of a list of the recorded histories of the manipulations on display record medium devices; and
   searching for at least one of a history of the information written to display record medium devices associated with the determined manipulation history, a history of other manipulations on a display record medium associated with the manipulation history and a unique identifier of a display record medium device associated with the manipulation history in response to the determined manipulation history.

15. A computer readable medium storing a program causing a computer to execute a process for management of various pieces of information, the process comprising:
   selecting information to be displayed on a rewritable display record medium device having a unique identifier;
   rewritably writing to and displaying the selected information on the display record medium device;
   detecting a selective manipulations of a first user on the display record medium device displaying information;
   recording a history of the information written to the display record medium device and a history of the manipulations in association with the unique identifier of the display record medium device, respectively;
   determining any manipulation history out of a list of histories of manipulations on display record medium devices; and
   searching for at least one of a history of the information written to a display record medium device associated with the determined manipulation history, a history of other manipulations on the display record medium device associated with the determined manipulation history and the identifier of the display record medium device associated with the determined manipulation history in response to the manipulation history.

16. An information processing system comprising:
   a history storage section that records a history of information written to rewritable display record medium devices each having a unique identifier and a history of manipulations executed on each rewritable display record medium device in association with the unique identifier of each rewritable display record medium device;
   a manipulation history determination section for a second user to select any manipulation history out of a list of histories of manipulations on the rewritable display record medium devices, recorded in the history storage section; and
   an information search section that searches for, in responsive to the manipulation history determined by the manipulation history determination section, at least one of a history of the information written to a display record medium device associated with the manipulation history, a history of other manipulations on the display record medium device associated with the determined manipulation history and the unique identifier of the display record medium device associated with the determined manipulation history.

17. An information processing method comprising:
   recording a history of information written to display record medium devices each having a unique identifier, where display information can be rewritten and a history of manipulations executed on each display record medium device in association with the unique identifier of the display record medium device;
   accepting a second user's selection of any manipulation history out of a list of the recorded histories of the manipulations on the display record medium devices; and
   searching for at least one of a history of the information written to a display record medium device associated with the determined manipulation history, a history of other manipulations on the display record medium device associated with the determined manipulation history and the unique identifier of the display record medium device associated with the determined manipulation history in response to the determined manipulation history.

18. A computer readable medium storing a program causing a computer to execute a process comprising:
   recording a history of information written to display record medium devices each having a unique identifier, where display information can be rewritten and a history of manipulations executed on each display record medium device in association with the unique identifier of the display record medium device;
   selecting any manipulation history out of a list of histories of the manipulations display record medium devices; and searching for at least one of a history of the information written to a display record medium device associated with the determined manipulation history, a history of other manipulations on the display record medium associated with the determined manipulation history device and the unique identifier of the display record medium device associated with the determined manipulation history in response to the manipulation history.

* * * * *